US006979057B2

(12) United States Patent
Sedlack

(10) Patent No.: US 6,979,057 B2
(45) Date of Patent: Dec. 27, 2005

(54) MECHANISM FOR CONNECTING INFANT CAR SEAT AND BASE

(75) Inventor: Mark Sedlack, Cuyahoga Falls, OH (US)

(73) Assignee: Baby Trend, Inc., Ontario, CA (US)

( * ) Notice: Subject to any disclaimer, the term of this patent is extended or adjusted under 35 U.S.C. 154(b) by 0 days.

(21) Appl. No.: 10/854,727

(22) Filed: May 26, 2004

(65) Prior Publication Data

US 2004/0217636 A1 Nov. 4, 2004

Related U.S. Application Data

(62) Division of application No. 10/152,921, filed on May 21, 2002, now Pat. No. 6,834,915.

(60) Provisional application No. 60/361,922, filed on Mar. 4, 2002.

(51) Int. Cl.⁷ ................................................ B60N 2/28
(52) U.S. Cl. ............................... 297/256.15; 297/250.1
(58) Field of Search ......................... 297/250.1, 256.16

(56) References Cited

U.S. PATENT DOCUMENTS

| 2,269,969 | A | 1/1942 | Shaulson |
| 3,912,329 | A | 10/1975 | Connors et al. |
| 4,237,174 | A | 12/1980 | Lagardere et al. |
| D285,383 | S | 9/1986 | Anthony |
| 4,826,246 | A | 5/1989 | Meeker |
| 5,007,141 | A | 4/1991 | Gentes |
| 5,058,283 | A | 10/1991 | Wise et al. |
| 5,265,910 | A | 11/1993 | Barr et al. |
| 5,432,985 | A | 7/1995 | Bernart |
| 5,466,044 | A | 11/1995 | Barley et al. |
| 5,478,135 | A * | 12/1995 | Kain .................. 297/256.16 X |
| 5,516,190 | A | 5/1996 | Kain et al. |
| 5,544,935 | A | 8/1996 | Cone, II et al. |
| 5,567,008 | A * | 10/1996 | Cone, II ............ 297/256.16 X |
| 5,651,581 | A | 7/1997 | Myers et al. |
| 5,658,044 | A | 8/1997 | Krevh |
| D389,286 | S | 1/1998 | Celestina-Krevh et al. |
| 5,733,004 | A | 3/1998 | Celestina-Krevh et al. |
| 5,803,535 | A | 9/1998 | Cabagnero |
| 5,806,924 | A | 9/1998 | Gonas |
| 5,839,793 | A | 11/1998 | Merrick et al. |
| 5,863,097 | A | 1/1999 | Harper et al. |
| 5,887,950 | A | 3/1999 | Kuo |
| D408,961 | S | 5/1999 | Myers |
| 5,961,180 | A | 10/1999 | Greger et al. |
| 5,971,476 | A | 10/1999 | Gibson et al. |
| 6,042,182 | A | 3/2000 | Geis et al. |
| 6,070,890 | A | 6/2000 | Haut et al. |
| 6,082,819 | A | 7/2000 | Jackson |
| 6,092,265 | A | 7/2000 | Sesay |
| 6,139,101 | A | 10/2000 | Berringer et al. |
| 6,145,927 | A | 11/2000 | Lo |

(Continued)

FOREIGN PATENT DOCUMENTS

DE  3112458  10/1982

(Continued)

*Primary Examiner*—Anthony D. Barfield
(74) *Attorney, Agent, or Firm*—Knobbe, Martens, Olson & Bear LLP

(57) ABSTRACT

An infant car seat is provided, including a car seat, a car seat base, and a mechanism for connecting the seat to the base. With the car seat base secured to a vehicle seat, the car seat can be conveniently connected to the base to safely transport an infant. The connection and release mechanisms between the car seat and the base are durable and easy to operate.

13 Claims, 40 Drawing Sheets

U.S. PATENT DOCUMENTS

| | | |
|---|---|---|
| 6,318,799 B1 | 11/2001 | Greger et al. |
| 6,322,142 B1 | 11/2001 | Yoshida et al. |
| 6,331,032 B1 | 12/2001 | Haut et al. |
| 6,347,832 B2 | 2/2002 | Mori |
| 6,375,260 B1 | 4/2002 | Hiramatsu et al. |
| 6,419,316 B1 | 7/2002 | Bergenheim |
| 6,425,632 B1 | 7/2002 | Anthony et al. |
| 6,428,100 B1 | 8/2002 | Kain et al. |
| 6,471,298 B2 | 10/2002 | Carine et al. |
| 6,669,288 B2 * | 12/2003 | Yoshida et al. ........ 297/256.16 |
| 6,695,400 B2 * | 2/2004 | Washizuka et al. ......... 297/130 |
| 6,698,841 B1 | 3/2004 | Glover et al. |

FOREIGN PATENT DOCUMENTS

| | | |
|---|---|---|
| FR | 909272 | 5/1946 |

* cited by examiner

MECHANISM FOR CONNECTING INFANT CAR SEAT AND BASE

REFERENCE TO RELATED APPLICATION

This application is a divisional of U.S. patent application Ser. No. 10/152,921, filed on May 21, 2002, now U.S. Pat. No. 6,834,915 which claims priority to U.S. Provisional Application No. 60/361,922, filed Mar. 4, 2002, the entire disclosures of which are hereby incorporated by reference herein.

BACKGROUND OF THE INVENTION

1. Field of the Invention

The invention relates to infant car seats for seating and transporting infants and small children.

2. Description of the Related Art

Infant car seats are commonly used to conveniently and safely seat and transport infants and small children. Such car seats generally comprise a molded plastic seat shell having a seat back for supporting the infant and a U-shaped handle that extends across the seat shell for carrying the seat shell.

Infant car seat systems include various other elements that can be used in connection with the car seat, such as strollers and car seat bases for supporting the car seat on the seat of a vehicle. The interconnection mechanisms between the car seat and the other elements, however, can often be difficult or confusing to operate.

Attachment of the car seat base to the vehicle seat is typically accomplished by routing the vehicle seat belt through various slots in the base, which can often be difficult and time consuming. In addition, the slots in the base are typically linear, and do not very well accommodate the range of seat belt entry angles that results from the differing locations of the seat belt buckles in various vehicle makes and models. Accordingly, the seat belt can become twisted and caught in the slots.

Some existing car seat bases include adjustment mechanisms to allow adjustment of the angular orientation of the car seat when the car seat is situated on the base. Such adjustment mechanisms, however, are typically located at the end of the base positioned against the vehicle seat back, making them difficult to reach and operate. In addition, the adjustment mechanisms typically operate by raising or lowering the end of the base adjacent the seat back, which can interfere with, and require readjustment of, the connection between the base and the vehicle seat.

Some car seat systems include strollers to which the car seat can be connected. Such strollers typically include a bar that extends across the frame of the stroller to support the car seat. In some systems, a detachable tray can be connected to the bar when the car seat is disconnected from the stroller to allow a larger child to be seated in the stroller seat. The tray can be used to support items such as drink cups, food and toys. Because the tray is detachable from the bar, however, the tray can easily be misplaced.

SUMMARY OF THE INVENTION

Accordingly, an infant carrier system is provided wherein the interconnection mechanisms between the carrier and the other elements of the system are convenient and simple to operate.

In accordance with one aspect of the present invention, a base is provided for supporting an infant car seat on a vehicle seat. The base comprises a main body, a foot portion beneath the main body, a lifter between the main body and the foot portion, the lifter having a threaded recess, and a screw extending into the recess. Rotation of the screw moves the lifter along the foot portion to extend or retract the foot portion relative to the main body.

In accordance with another aspect of the present invention, a base for supporting an infant car seat on a seat of a vehicle is provided. The base comprises a main body, a first rail slideably connected to the main body, the first rail having a latch at an end thereof for connection to the vehicle, and a second rail slideably connected to the main body, the second rail having a latch at an end thereof for connection to the vehicle. A first lock is associated with the first rail to selectively engage the first rail to lock the first rail in position relative to the main body. A second lock is associated with the second rail to selectively engage the second rail to lock the second rail in position relative to the main body.

In accordance with another aspect of the present invention, an apparatus is provided, comprising a base and an infant car seat. The base includes a main body and a connection bracket extending from the main body. The connection bracket includes a first side wall having a first slot therein, a first pawl pivotably connected adjacent the first side wall, a biasing member biasing the first pawl towards the first slot, a second side wall spaced apart from the first side wall and having a second slot therein, a second pawl pivotably connected adjacent the second side wall, and a second biasing member biasing the second pawl towards the second slot. The infant car seat includes a seat shell and a rod extending through the seat shell. The rod extends into the first and second slots when the car seat is situated on the base. The first and second pawls extend over the rod to lock the car seat to the base.

In accordance with another aspect of the present invention, an apparatus is provided, comprising an infant car seat and a stroller. The infant car seat includes a first support having a first recess therein, a second support having a second recess therein, a first mounting hook, a second mounting hook, a first release strap and a second release strap. The first mounting hook includes a first leg and a second leg connected to the first leg. The first leg has a barb extending therefrom. The barb extends into the first recess. The second mounting hook includes a first leg and a second leg connected to the first leg. The first leg has a barb extending therefrom. The barb extends into the second recess. The first strap connects the release handle to the first leg of the first mounting hook. The second strap connects the release handle to the first leg of the second mounting hook. The stroller includes a stroller frame and a bar connected to a bar connected to the stroller frame. The bar includes a first opening, a first engagement surface, a second opening, and a second engagement surface. The first and second supports extend into the first and second openings when the car seat is situated on the bar. The barbs engage the first and second engagement surfaces to lock the car seat to the stroller.

DETAILED DESCRIPTION OF THE PREFERRED EMBODIMENTS

Figure 1:
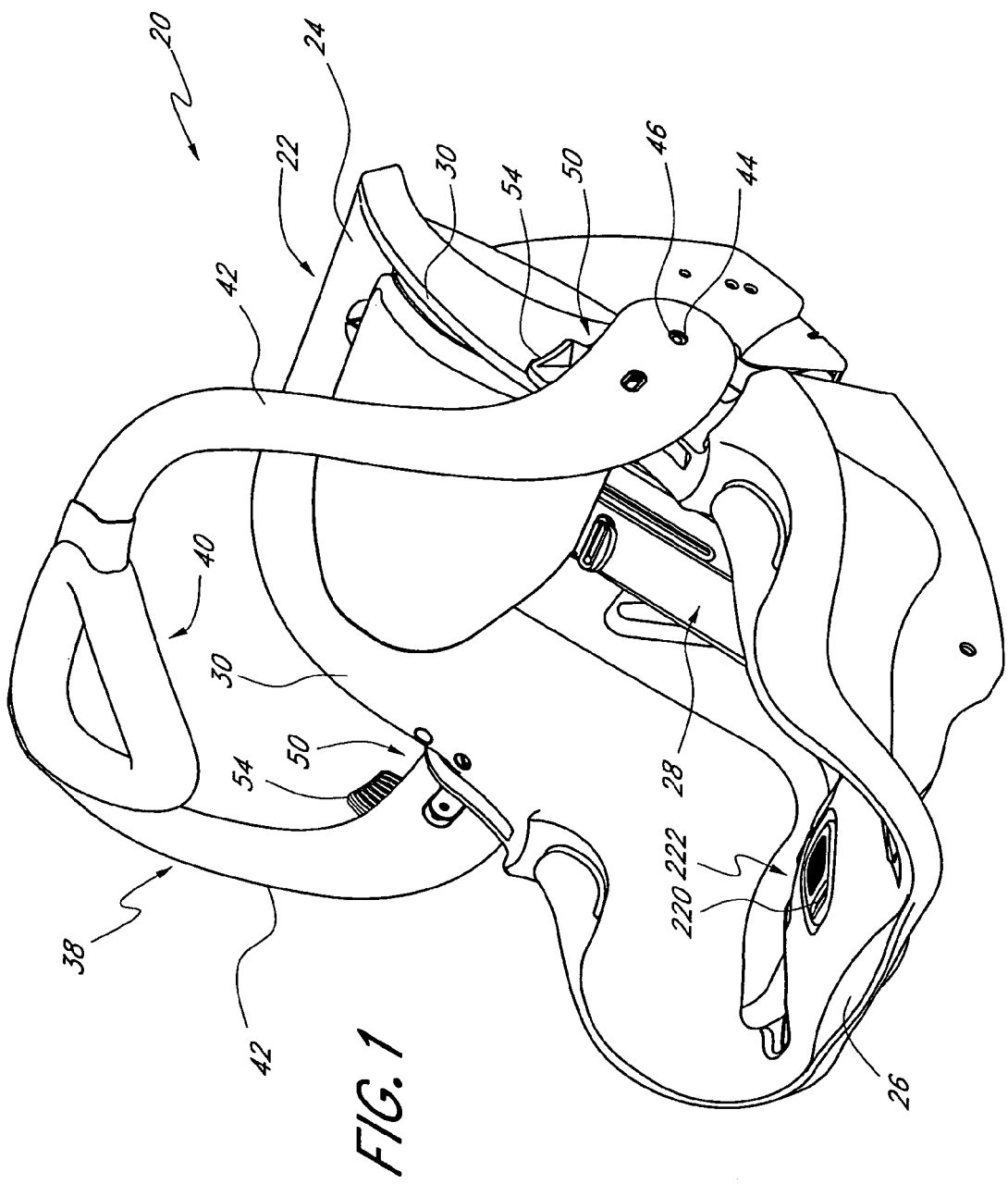
FIG. 1 is a front perspective view of one embodiment of an infant car seat having certain features and advantages in accordance with the present invention.

With reference initially to FIG. 1, an infant car seat 20 is illustrated having certain features and advantages in accordance with the present invention. In the illustrated embodiment, the infant car seat 20 includes a molded plastic seat shell 22 having a head end 24 and a foot end 26. The seat shell 22 includes a seating surface 28 and a pair of side walls 30 that extend upwardly from the sides of the seating surface 28. The seating surface 28 and the side walls 30 are preferably covered with a removable padding material (not shown) to comfortably support an infant in the seat shell 22.

As illustrated in FIG. 1, a handle assembly 38 extends transversely across the seat shell 22 and is connected to the side walls 30. In the illustrated embodiment, the handle assembly 38 includes a generally triangular central grip portion 40 and a pair of handle arms 42 that extend towards the side walls 30 from the grip portion 40. The ends of the handle arms 42 opposite the grip portion 40 preferably are rotatably connected to the seat shell by rivets 44 or other suitable fasteners that extend through openings 46 in the ends of the handle arms 42. The rivets 44 preferably extend through brackets (not shown) which, in turn, are connected to the side walls 30 of the seat shell.

A lock mechanism 50 preferably is provided at the end of each of the handle arms 42 to lock the handle assembly 38 in a desired rotational position relative to the seat shell 22. In the illustrated embodiment, the lock mechanisms 50 are operated by actuators 54 that extend from pockets in the handle arms 42. When both of the actuators 54 are manually pressed into the pockets, the handle assembly 38 can be rotated relative to the seat shell 22. In FIG. 1, the handle assembly 38 is illustrated in a typical carrying orientation, wherein the handle assembly 38 extends above the seat shell 22. By pressing the actuators 54, the handle assembly 38 can be rotated and locked behind the head end 24 of the seat shell, for example, to more conveniently allow an infant to be placed in or removed from the car seat 20.

It is to be understood that the particular configurations of the handle assembly 38 and handle lock mechanisms 50 illustrated are merely exemplary. Those skilled in the art will recognize that other suitable handle assemblies and handle lock mechanisms can alternatively be used.

Movable Seat Back

Figure 2:
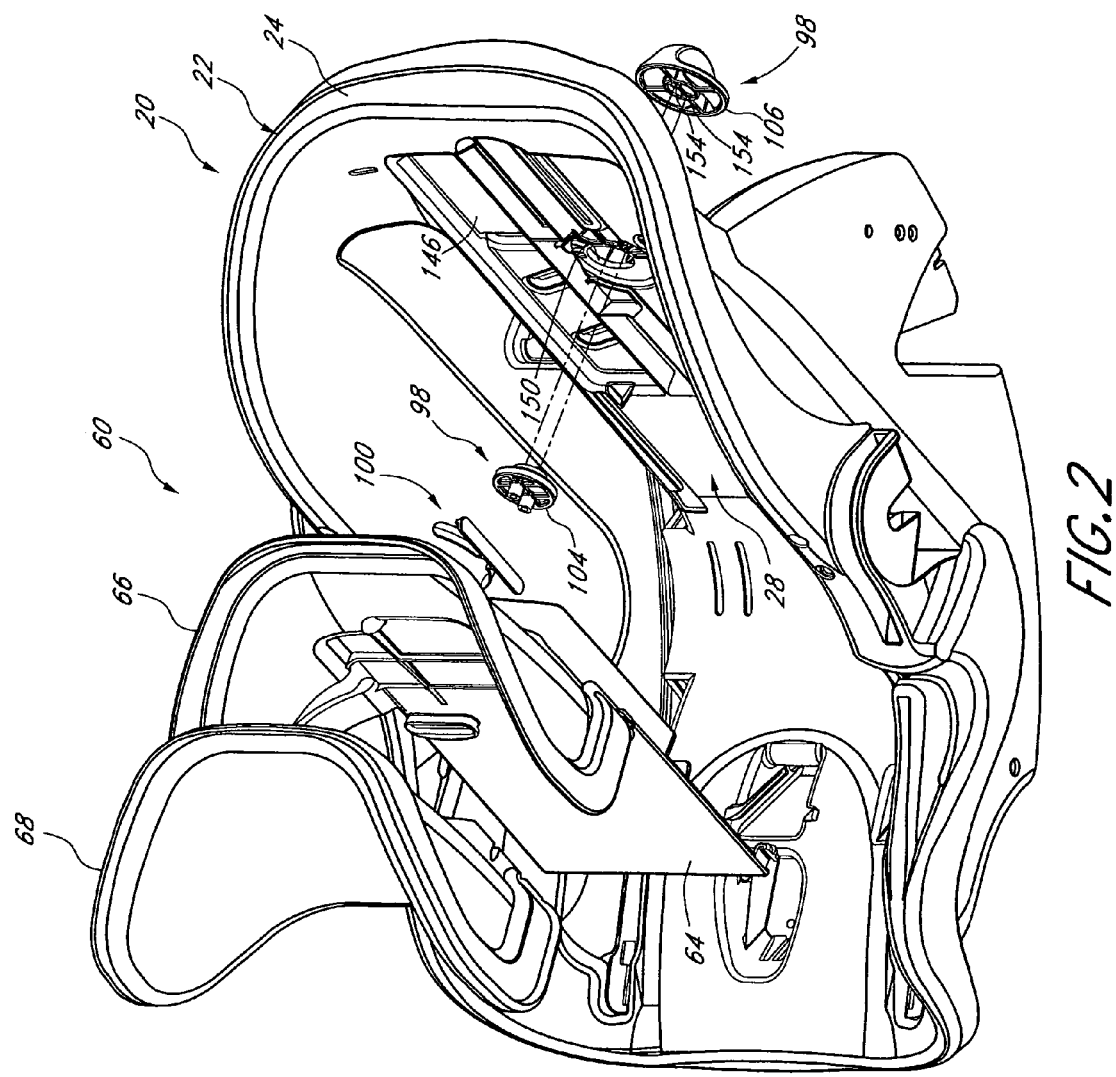
FIG. 2 is a front perspective view of the infant car seat illustrating the movable seat back and adjustment mechanism in exploded view.
Figure 3:
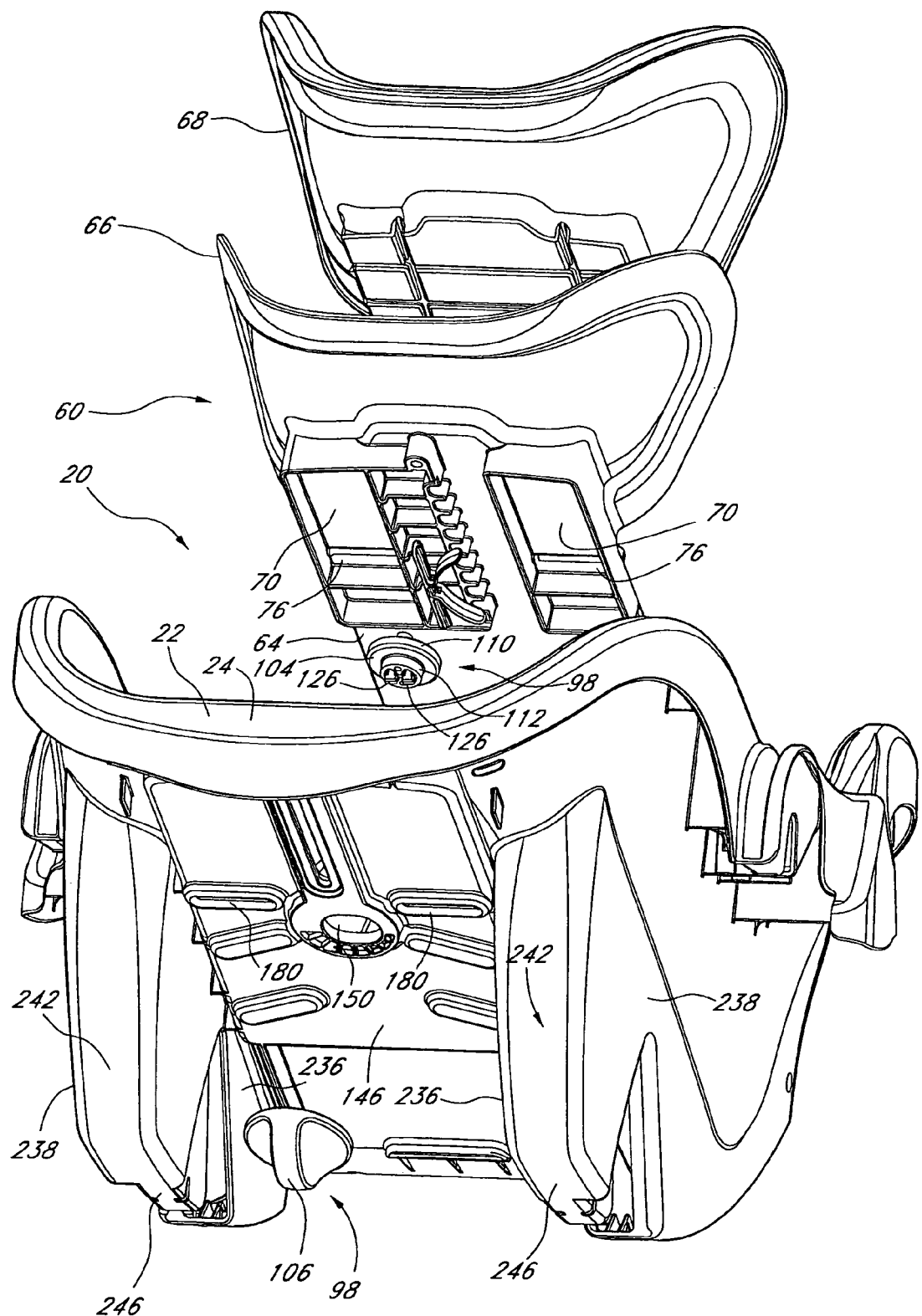
FIG. 3 is a rear perspective view of the infant car seat illustrating the movable seat back and adjustment mechanism in exploded view.

With reference now to FIGS. 2 and 3, in the illustrated embodiment, the infant car seat 20 includes a movable seat back 60. The seat back 60 has an elongated center portion 64 and a head rest portion 66 that extends outwardly from the sides of the center portion 64. A head rest insert 68, preferably comprising an expanded polystyrene (EPS) foam, fits over the head rest portion 66 to support the head of an infant occupying the car seat 20.

Figure 4:
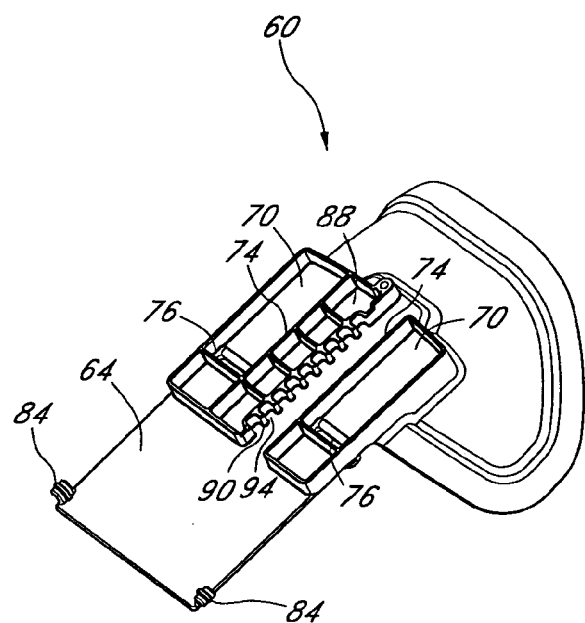
FIG. 4 is a rear perspective view of the movable seat back.

As best illustrated in FIG. 4, a shoulder belt channel 70 is formed along each side of the center portion 64 of the seat back 60 by ribs 74 that extend from the center portion 64. A transversely extending slot 76 is provided at an end of each of the channels 70 for passage of a first safety belt 80 and a second safety belt 82 (see FIG. 14). A number of hooks 84 extend from the sides of the center portion 64 to connect the seat back 60 to the seat shell 22 in a manner to be described in greater detail below.

In the illustrated embodiment, the car seat 20 includes an adjustment mechanism 88 to adjust the longitudinal position of the seat back 60 relative to the seat shell 22. With reference still to FIG. 4, the adjustment mechanism 88 includes a plurality of adjustment teeth 90, which are provided along the center portion 64 of the seat back 60. In the illustrated embodiment, the adjustment teeth 90 are arranged in a line extending longitudinally along the center portion 64. The individual adjustment teeth 90 extend laterally towards a side of the center portion 64 and define a number of generally U-shaped valleys 94 therebetween.

Figure 5:
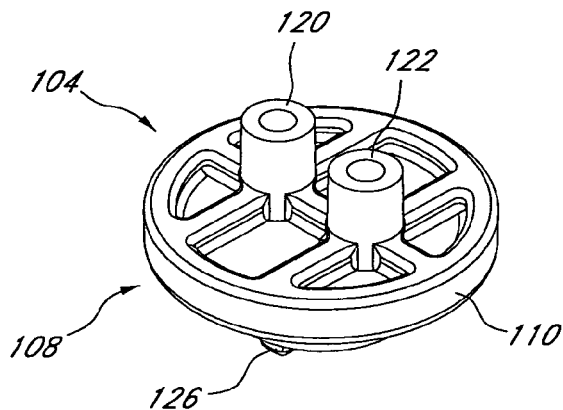
FIG. 5 is a front perspective view of the inner member of the adjuster of the adjustment mechanism.
Figure 6:
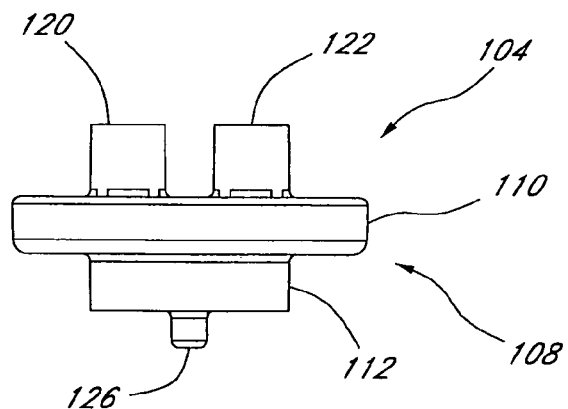
FIG. 6 is a side elevational view of the inner member.
Figure 7:
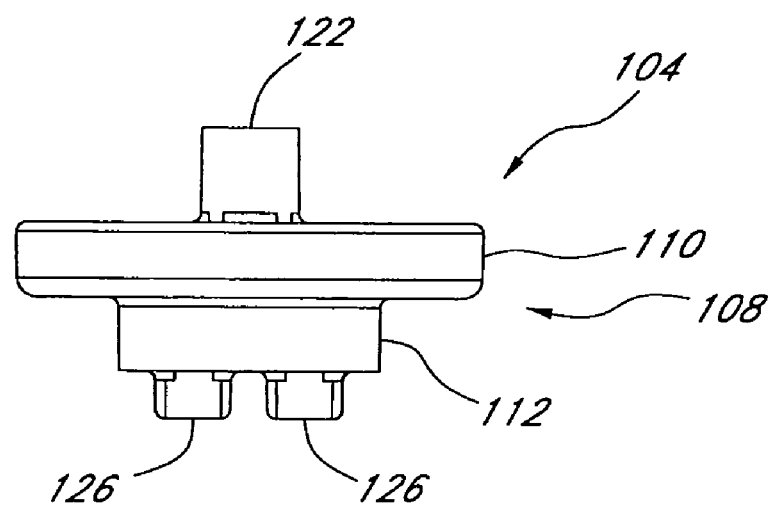
FIG. 7 is side elevational view of the inner member rotated 90 degrees from the orientation of FIG. 6.

As illustrated in FIGS. 2 and 3, the adjustment mechanism 88 further includes an adjuster 98 and a biasing member 100. In the illustrated embodiment, the adjuster 98 includes an inner member 104 and an outer member 106. The inner member 104, illustrated in FIGS. 5–7, includes a main body 108 having a larger diameter portion 110 and a smaller diameter portion 112. A first cylindrical projection 120 and a second cylindrical projection 122 extend from the larger diameter portion 110. Each of the projections 120, 122 has a central axis offset from a central axis of the main body 108. Preferably, the projections 120, 122 are aligned on opposite sides of the central axis of the main body 108. As best illustrated in FIG. 7, a pair of tabs 126 extends from the smaller diameter portion 112 of the main body 108.

Figure 8:
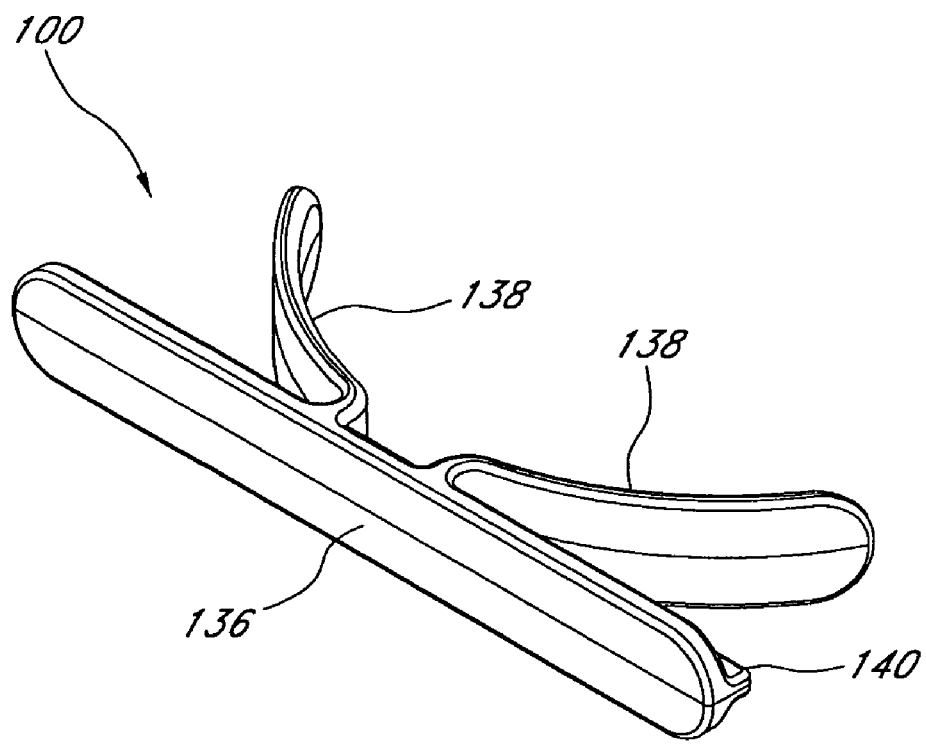
FIG. 8 is a front perspective view of the biasing member of the adjustment mechanism.

As best illustrated in FIG. 8, the biasing member 100 comprises a generally K-shaped member having a contact segment 136 and a pair of cantilever legs 138. Each of the legs 138 is attached at one end to a side of the contact segment 136. A rib 140 extends along the side of the contact segment 136 to reinforce the contact segment 136.

With reference again to FIG. 3, in the illustrated embodiment, a recessed area 146 is provided in the seating surface 28 of the seat shell 22 near the head end 24 of the seat shell 22. A transversely extending slot 150 is provided in the recessed area 146. Preferably, the height of the slot 150 in the longitudinal direction of the seat shell 22 is slightly greater than the diameter of the smaller diameter portion 112 of the main body 108 of the inner member 104, and less than the diameters of the larger diameter portion 110 and the outer member 106 of the adjuster 98.

The inner member 104 of the adjuster 98 is positioned on the inside of the seat shell 22 so that the larger portion 110 of the main body 108 abuts the seat shell 22 and the smaller portion 112 extends through the slot 150. The outer member 106 of the adjuster 98 is positioned on the outside of the seat shell 22 and is aligned with the inner member 104. The tabs 126 of the inner member 104 extend into openings 154 (see FIG. 2) formed in the outer member 106. One or more screws (not shown) extend through the inner member 104 into the outer member 106 to connect the inner member 104 to the outer member 106, thereby retaining the adjuster 98 in the slot 150.

Figure 9:
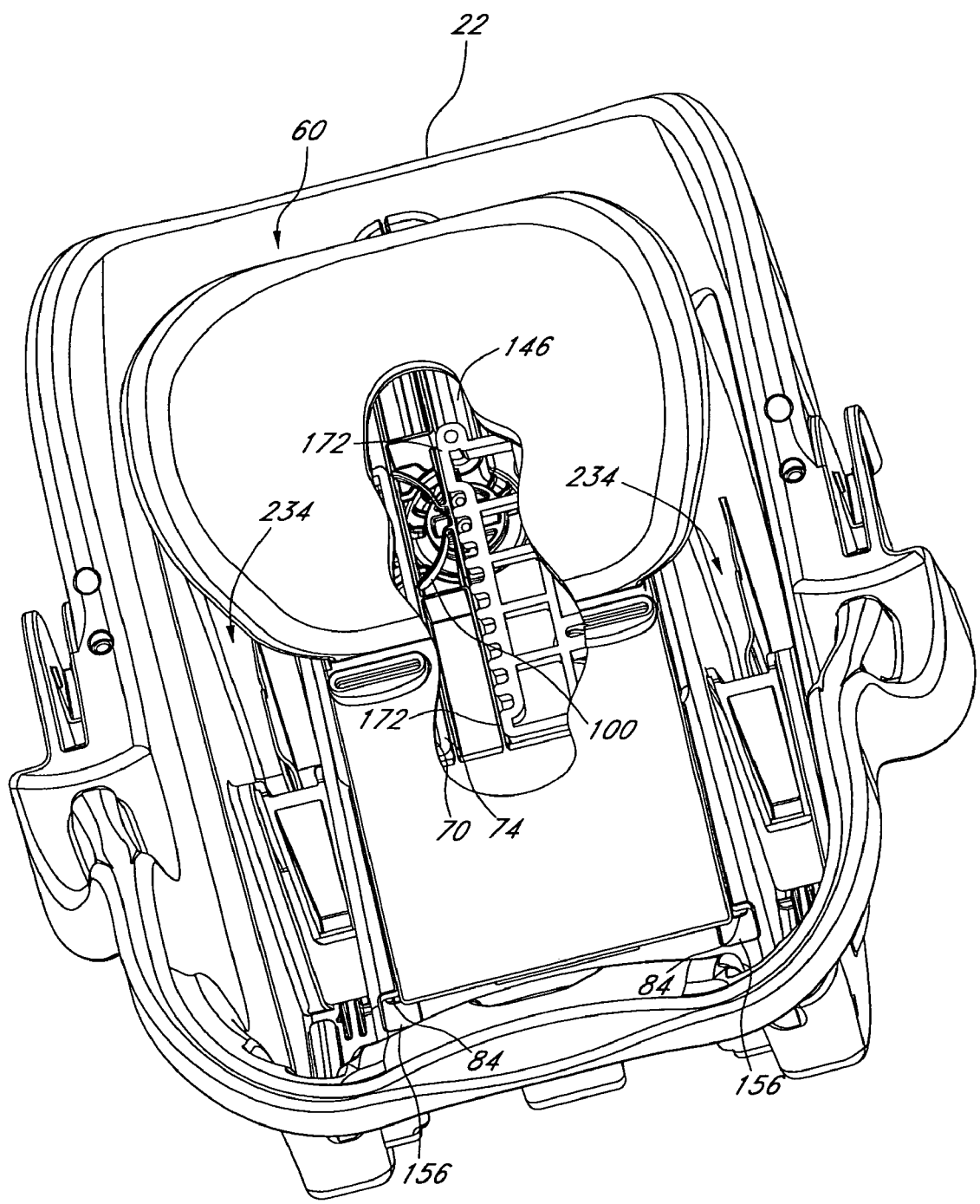
FIG. 9 is a front perspective view of the infant car seat with a portion of the movable seatback cut away to illustrate the adjustment mechanism.

With reference now to FIG. 9, the seat back 60 is positioned at the inside of the seat shell 22 so that the ribs 74 defining the shoulder belt channels 70 extend into the recessed area 146 of the seat shell 22. The hooks 84 at the sides of the seat back 60 extend into longitudinal slots 156 that extend along the seating surface 28 below the recessed area 146. A fastener, such as a rivet (not shown), extends through an opening 152 provided in the seat back 60 above the adjustment teeth 90, and through a longitudinally extending slot 154 provided in the seat shell 22. The seat back 60 is thereby slideably connected to the seat shell 22. Additional fasteners (not shown) may be provided through various openings (not shown) in the seat back 60 and slots (not shown) in the seat shell 22, as necessary, to retain the seat back 60 in parallel to the recessed area 146 of the seat shell 22.

Figure 10:
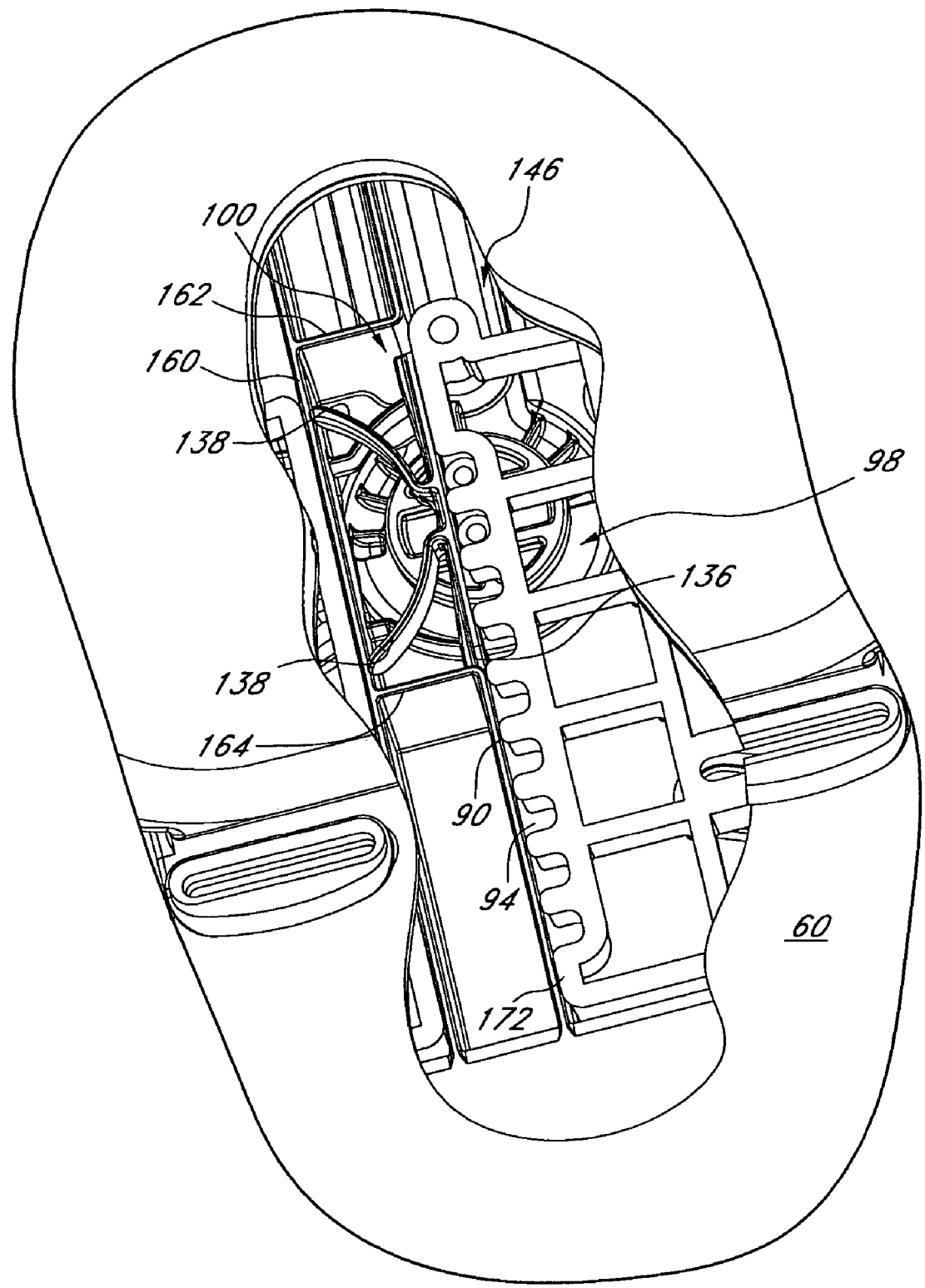
FIG. 10 is an enlarged cutaway view of the adjustment mechanism with the adjuster in a first rotational orientation.

The biasing member 100 is positioned between the seat back 60 and the seat shell 22. As best illustrated in FIG. 10, a first rib 160 extends longitudinally along the recessed portion 146 of the seat shell 22. A second rib 162 and a third rib 164 extend laterally along the recessed portion 146 from the first rib 160 towards the adjuster 98. The legs 138 of the biasing member 100 contact the first rib 160. The contact segment 136 of the biasing member 100 contacts the adjustment teeth 90 provided along the seat back 60.

When the adjuster 98 is oriented as shown in FIGS. 9 and 10, each of the projections 120, 122 resides in one of the valleys 94 between the adjustment teeth 90. The second projection 122 is above the first projection 120. The first and second projections 120, 122 cooperate with the adjustment teeth 90 to fix the longitudinal position of the seat back 60 relative to the seat shell 22.

Figure 11:
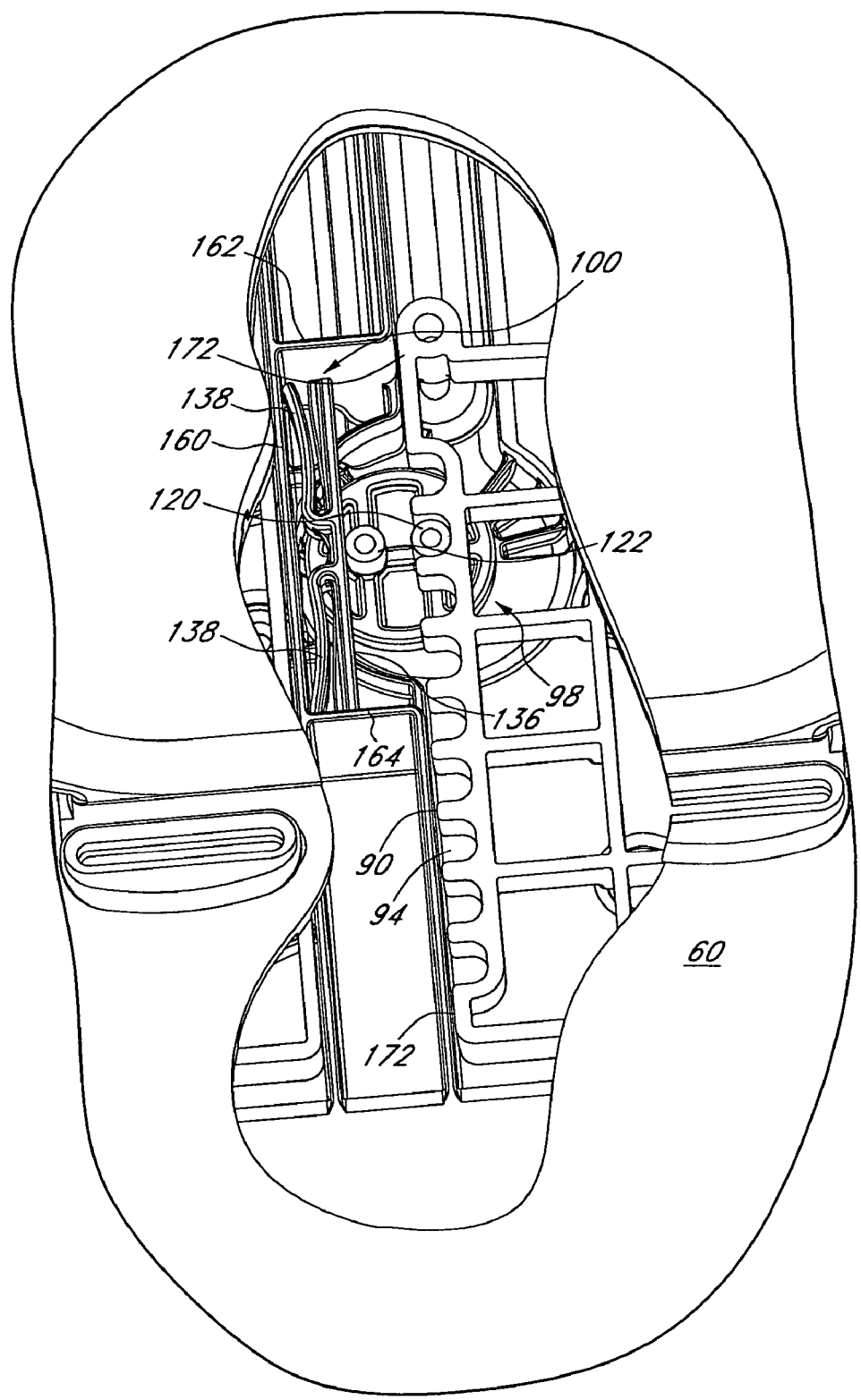
FIG. 11 is an enlarged cutaway view with the adjustment mechanism with the adjuster rotated 90 degrees from the first rotational orientation of FIG. 10.

When the adjuster 98 is rotated as illustrated in FIG. 11, the first projection 120 abuts the bottom of one of the valleys 94 between the adjustment teeth 90. The second projection 122 contacts and slides along the contact segment 136 of the biasing member 100. The contact segment 136 is moved towards the first rib 160, causing the legs 138 of the biasing member 100 to flex. The second and third ribs 162, 164 help to retain the biasing member 100 in place as the second projection 122 slides along the contact segment 136.

As the adjuster 98 is rotated, the axis of rotation of the main body 108 is moved laterally in the slot 150 away from the adjustment teeth 90. As a result, the first projection 120 is moved generally linearly along the longitudinal axis of the seat shell 22. When the adjuster 98 is rotated from the orientation of FIGS. 9 and 10 to the orientation of FIG. 11, the first projection 120 is moved longitudinally towards the head end 24 of the seat shell 22. The second projection 122 is rotated around the first projection 120 towards the foot end 26 of the seat shell 22.

As the adjuster 98 is rotated beyond the orientation illustrated in FIG. 11, the axis of rotation of the main body 108 is moved laterally in the slot 150 back towards the adjustment teeth 90. The biasing member 100 urges the second projection 122 towards the adjustment teeth 90 and into the valley 94 below the first projection 120. Thus, as adjuster 98 is rotated counterclockwise (from a perspective inside the seat shell) 180 degrees from the orientation of FIGS. 9 and 10, the second projection 120 is rotated from the valley 94 above the first projection 120 to the valley 94 below the first projection 120, thereby extending the seat back 60 relative to the seat shell 22.

Accordingly, by rotating the adjuster 98, the longitudinal position of the seat back 60 can be adjusted to accommodate infants of various sizes. The first and second projections 120, 122 mate with the adjustment teeth 90 to extend or retract the seat back 60 relative to the seat shell 22. Preferably, as illustrated in FIG. 11, a stop surface 172 is provided at each end of the adjustment teeth 90 so that, when the seat back 60 is fully extended or retracted, one of the projections 120, 122 abuts the stop surface 172 to prevent the adjuster 98 from being further rotated.

Advantageously, the movable seat back 60 allows the car seat 20 to be better fitted to the size of the infant occupying it. The seat back 60 can be extended as the infant grows. By adjusting the position of the seat back 60 relative to the seat shell 22, the head rest portion 66 can be moved into place behind the infant's head, increasing the comfort and safety of the infant.

The movable seat back 60 of the illustrated embodiment is simple and convenient to adjust. It can be extended or retracted simply by rotating the adjuster 98. In contrast to some prior art car seats, the first and second safety belts 80, 82 need not be re-threaded through the seat back 60 and/or the seat shell 22 to fit the infant after the seat back 60 has been adjusted. As the seat back 60 is adjusted, the safety belt harness is also adjusted. As a result, the potential for misuse of the car seat 20 is reduced.

Splitter Plate

With reference again to FIG. 3, in the illustrated embodiment, a safety belt slot 180 is provided in the recessed area 146 of the seat shell 22 on each side of the adjuster slot 150. Preferably, the safety belt slots 180 in the seat shell 22 are located so that they are generally in registration with the safety belt slots 76 in the seat back 60 when the seat back 60 is fully extended relative to said seat shell 22.

Figure 12:
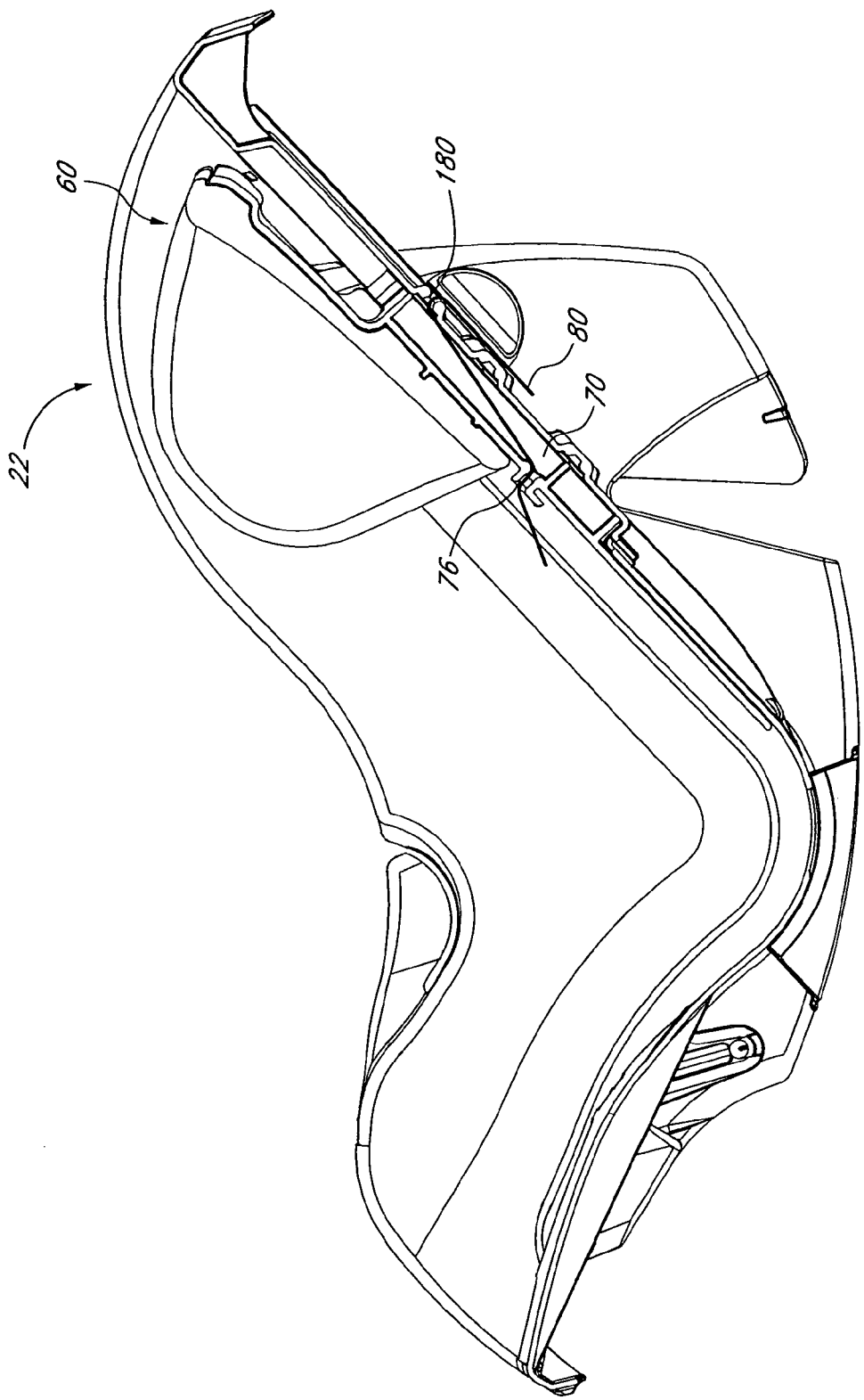
FIG. 12 is a left side view of the infant car seat with the left sides of the car seat and the movable seat back cut away to illustrate the routing of one of the safety belts of the car seat.

With reference now to FIG. 12, the first safety belt 80 extends from the inside of the seat shell 22 through one of the safety belt slots 76 in the seat back 60. The second safety belt 82 (not shown in FIG. 12) extends from the inside of the seat shell 22 through the other safety belt slot 76 in the seat back 60. The first and second safety belts 80, 82 extend through the channels 70 in the seat back 60 and through the safety belt slots 180 in the seat shell 22.

As the position of the seat back 60 is adjusted to fit the size of the infant occupying the car seat 20, the safety belt slots 76 in the seat back 60 are moved to position them directly above the shoulders of the infant. The first and second safety belts 80, 82 preferably are connected to a buckle (not shown) positioned in front of the infant. The buckle preferably is connected to various other belts (not shown) that extend between or around the legs of the infant, as is well known in the art, to restrain the infant in the car seat 20. In the illustrated embodiment, the buckle is connected to a crotch belt (not shown) that extends from a crotch belt pocket 184 (see FIG. 28) near the foot end 26 of the seat shell 22.

Figure 13:
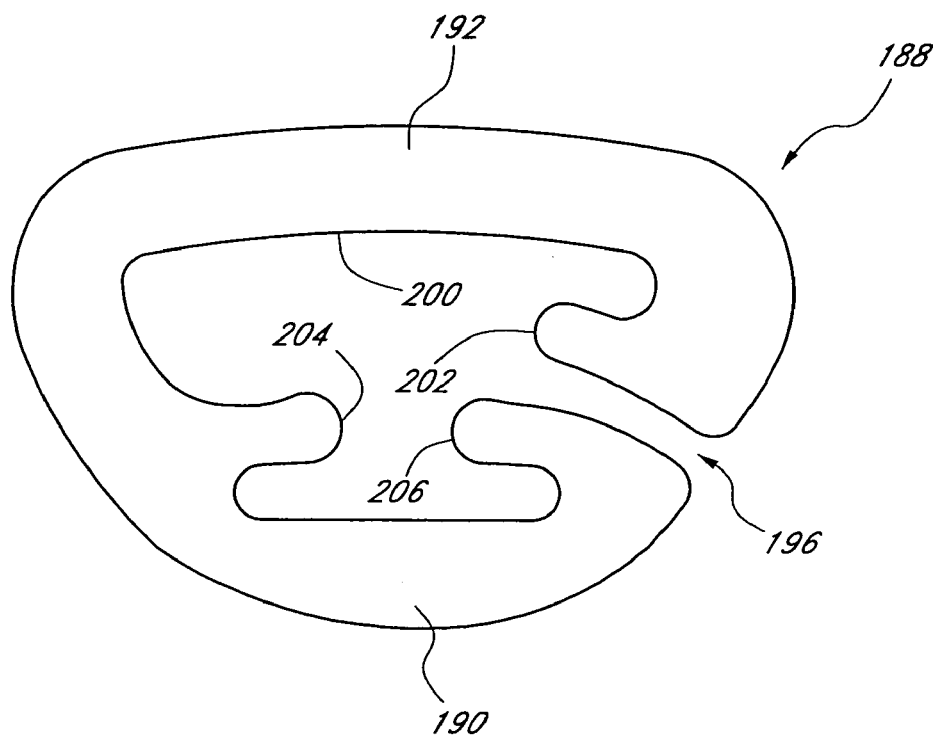
FIG. 13 is a rear view of the splitter plate of the infant car seat.

With reference to FIG. 13, the first and second safety belts 80, 82 preferably are connected behind the seat shell 22 to a splitter plate 188. In the illustrated embodiment, the splitter plate 188 includes a lower portion 190 and an upper portion 192 extending over the lower portion 190 from a first side of the lower portion 190 towards a second side of the lower portion 190. A gap 196 is provided between an end of the upper portion 192 and the second side of the lower portion 190.

The upper portion 192 preferably has a curved interior surface 200 and includes a retainer 202 that extends inwardly from the end of the upper portion 192. The lower portion 190 preferably includes a first retainer 204 that extends inwardly from the first side of the lower portion 190 and a second retainer 206 that extends inwardly from the second side of the lower portion 190.

Figure 14:
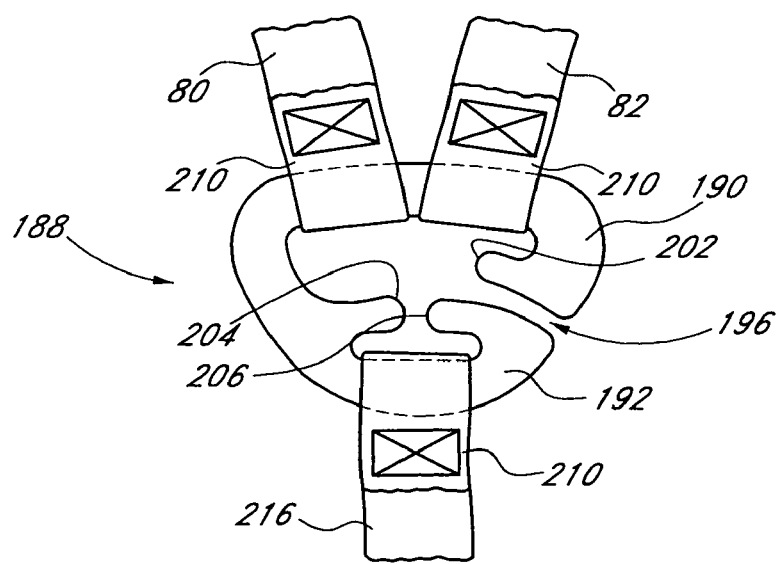
FIG. 14 is a rear view of the splitter plate with the safety belts of the car seat connected thereto.
Figure 15:
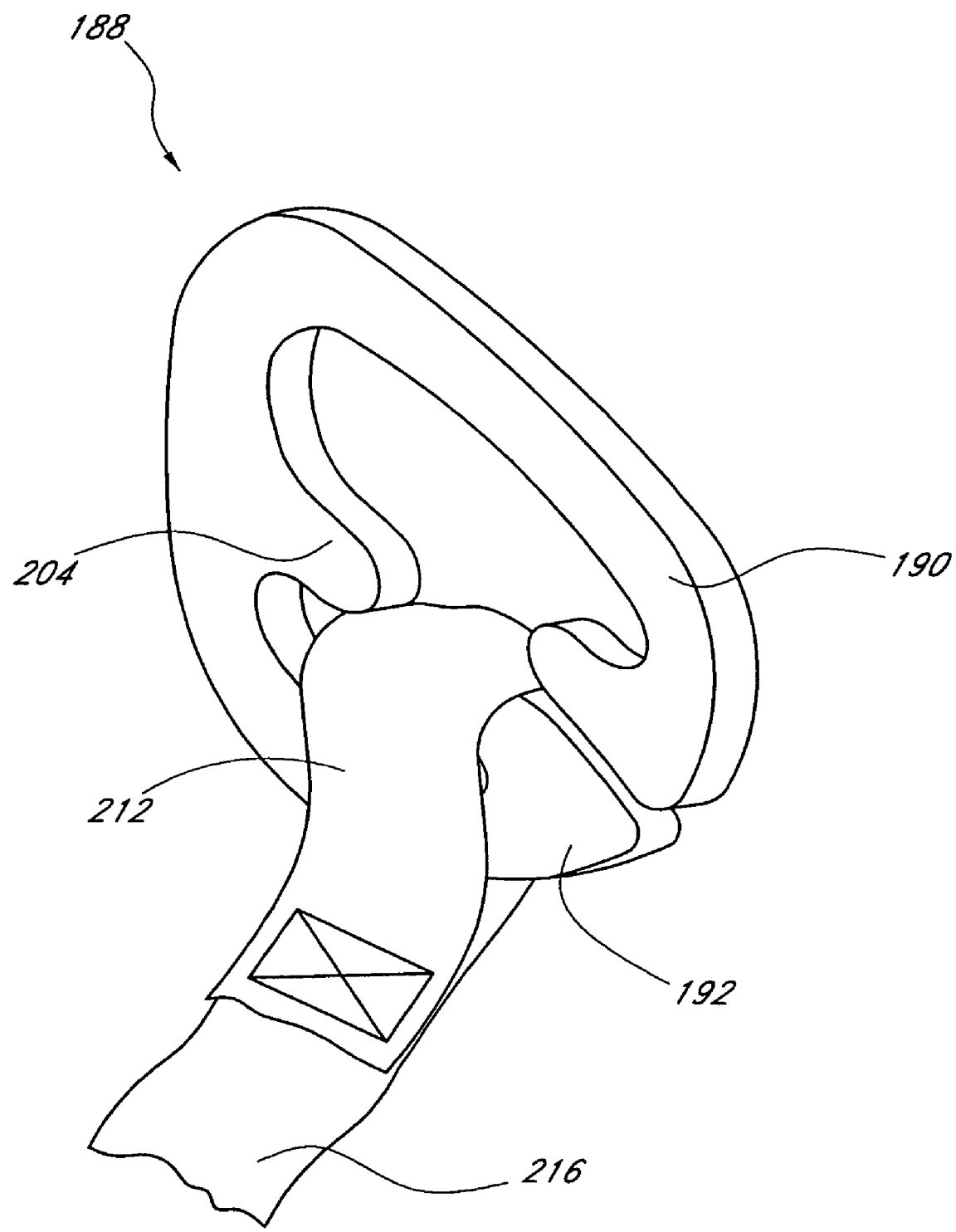
FIG. 15 is a perspective view of the splitter plate illustrating a first step in the connection of one of the safety belts.
Figure 16:
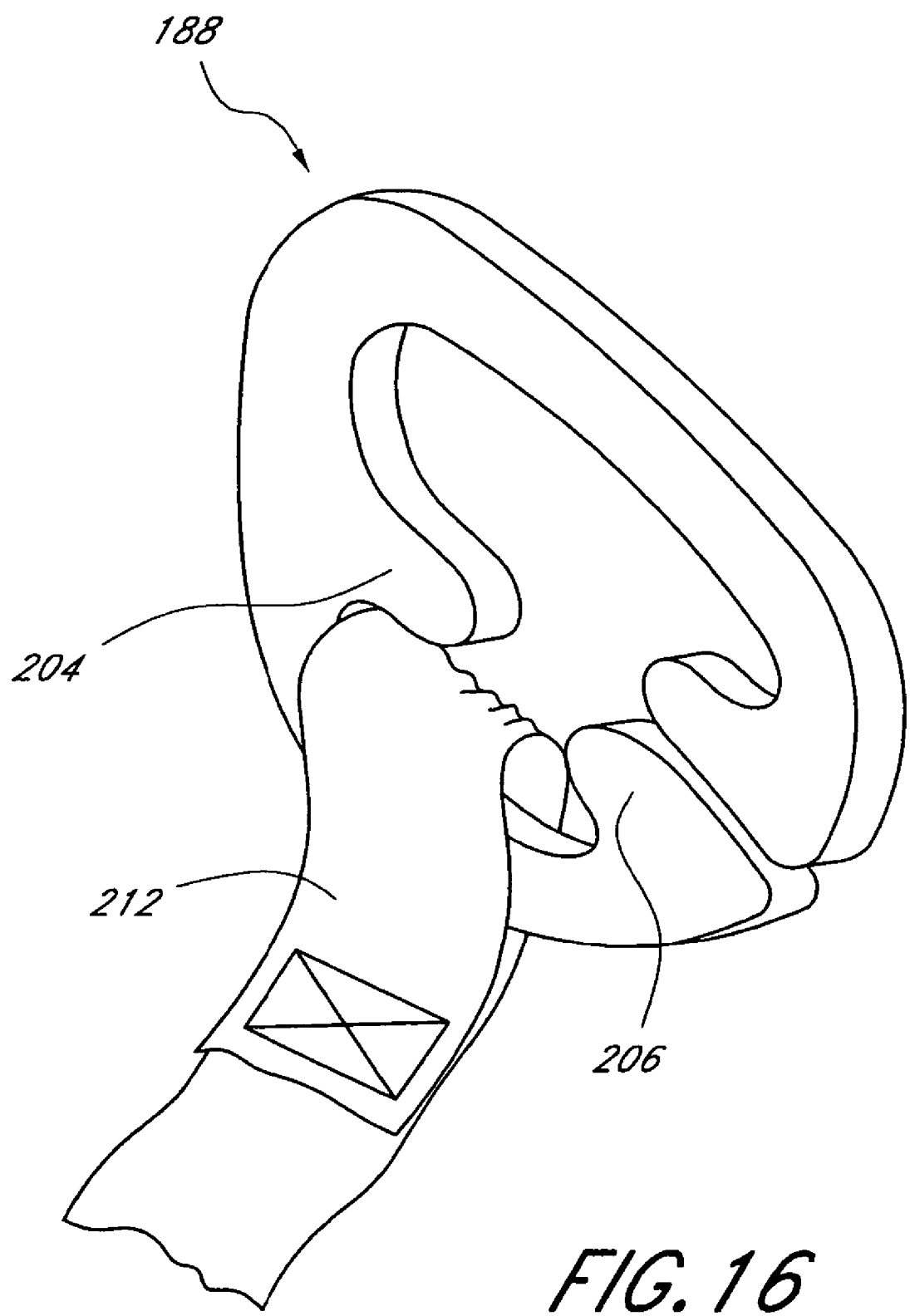
FIG. 16 is a perspective view of the splitter plate illustrating a second step in the connection of the safety belt of FIG. 15.

As illustrated in FIG. 14, the first and second safety belts 80, 82 preferably each have an end that is folded over and sewn to form a loop 210. A third safety belt 216, preferably also having a looped end 210, is connected to the splitter plate 188 by sliding the looped end 210 over the lower portion 190 of the splitter plate 188. A first side of the looped end 210 is first slid beneath the first retainer 204 of the lower portion, as illustrated in FIG. 15. The looped end 210 is then bunched together, as illustrated in FIG. 16, to allow a second side of the looped end 210 to slide beneath the second retainer 206, thereby preventing the looped end 210 of the third safety belt 216 from sliding off of the lower portion 190 of the splitter plate 188.

With reference again to FIG. 14, the first and second safety belts 80, 82 are connected to the splitter plate 188 by sliding the looped ends 210 over the upper portion 192 of the splitter plate 188. The retainer 202 prevents the looped ends 210 from sliding off of the upper portion 192. Advantageously, because the looped ends 210 of the first, second and third safety belts 80, 82, 216 can be slid through the gap 196, the sewing of the looped ends 210 can be performed prior to connecting the belts 80, 82, 216 to the splitter plate 188.

The curved interior surface 200 of the upper portion 192 of the splitter plate 188 accommodates the converging arrangement of the first and second safety belts 80, 82 and allows a greater width of the looped ends 210 to contact the upper portion 192 of the splitter plate 188. The curved surface 200 further prevents bunching of the looped ends 210 of the first and second safety belts 80, 82 at the ends of the upper portion 192.

With reference again to FIG. 1, the end of the third safety belt 216 opposite the splitter plate 188 preferably is routed through an opening 220 of a tensioning device 222 provided near the foot end 26 of the seat shell 22, as is well known in the art. When the tensioning device 222 is actuated, the third safety belt 216 can be drawn through the opening 220. When the device 222 is released, the belt 216 is constrained in the opening 220. Accordingly, by operating the tensioning device 222, the length of the third safety belt 216 extending behind the seat shell 22 can be varied. By reducing the effective length of the third safety belt 216, the splitter plate 188, and thus the ends 210 of the first and second safety belts 80, 82, can be drawn towards the foot end 26 of the seat shell 22 to remove any excess slack in the first and second safety belts 80, 82 and secure the infant in the car seat 20.

Multiple-range Angle Indicator

Figure 17:
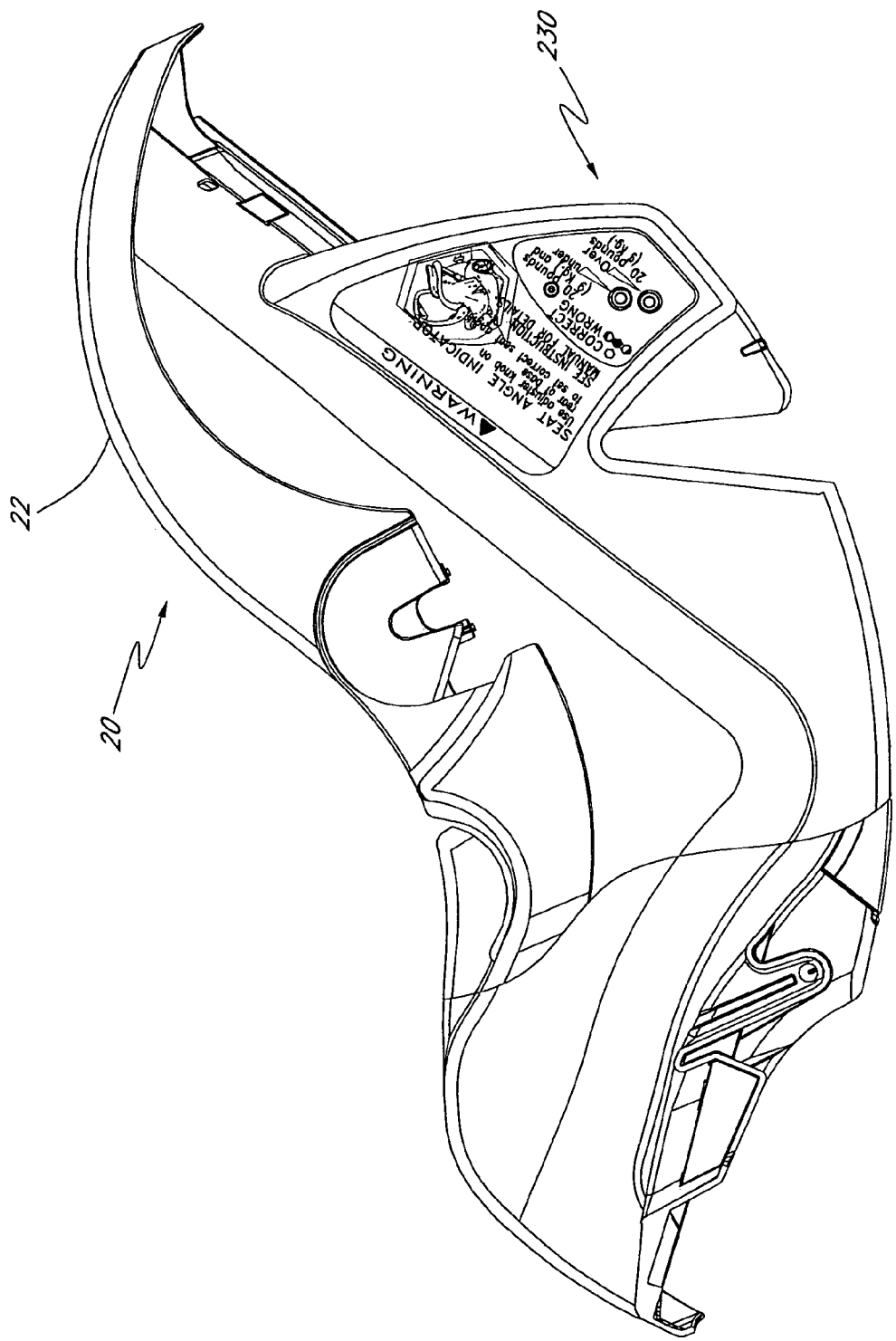
FIG. 17 is a left side view of the infant car seat with both viewing areas of the angle indicator of the car seat indicating a proper angular orientation of the car seat.

With reference now to FIG. 17, in the illustrated embodiment, the infant car seat 60 includes a multiple-range angle indicator 230. As discussed above, it is important for the safety of the infant that the infant not be too inclined or too reclined in the car seat 20 when the car seat 20 is being transported in an automobile. Generally, the seat shell 22 should be more inclined or upright when transporting larger infants, and more reclined when transporting smaller infants. The multiple-range angle indicator 230 of the illustrated embodiment allows the proper angular orientation of the seat shell 22 to be determined based on the weight of the infant occupying the car seat 20.

With reference again to FIG. 9, in the illustrated embodiment, a large pocket 234 is provided in the seat shell 22 on each side of the seating surface 28. As illustrated in FIG. 3, each of the pockets 234 is defined by an inner side wall 236 and an outer side wall 238 that extend generally vertically beneath the seating surface 28. The inner and outer side walls 236, 238 of each pocket 234 form a support 242 for supporting the car seat 20. Preferably, each of the supports 242 has a curved bottom surface 246 to allow the car seat 20 to rock back and forth on the supports 242 when the car seat 20 is placed on a floor or other surface.

Figure 18:
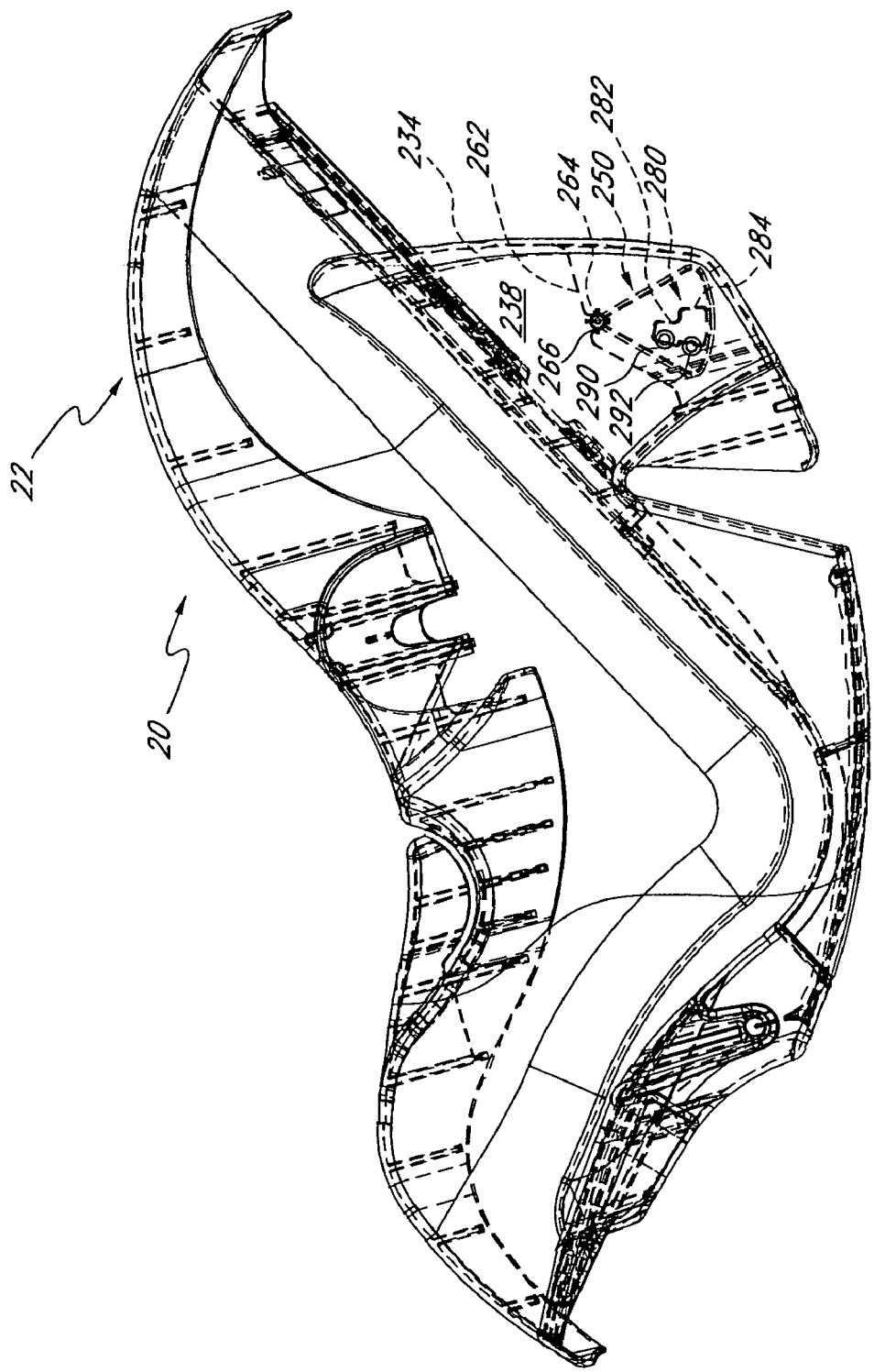
FIG. 18 is a left side view of the infant car seat illustrating the pendulum of the angle indicator in phantom.
Figure 19:
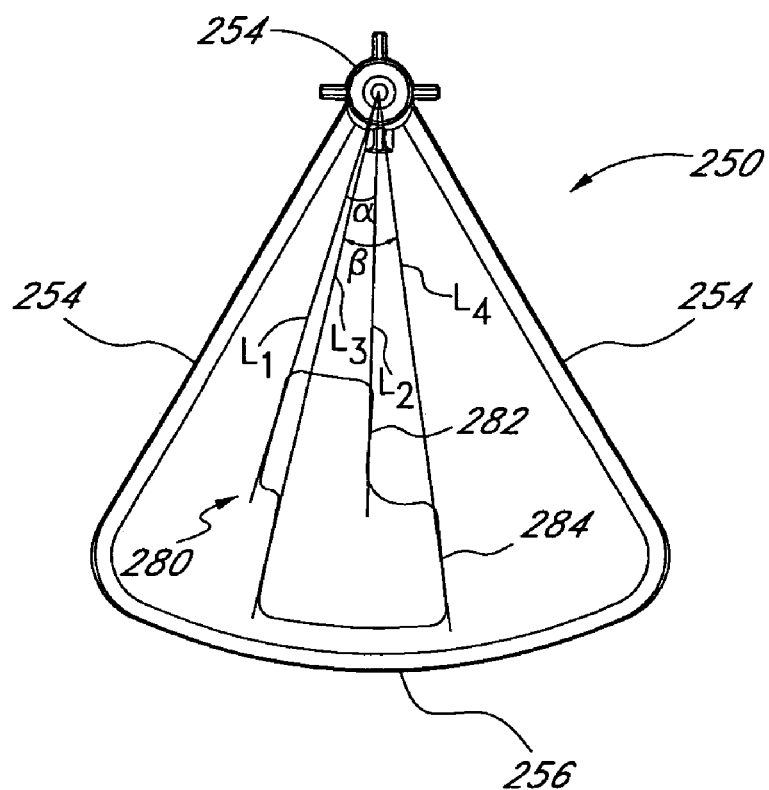
FIG. 19 is a side elevational view of the pendulum.
Figure 20:
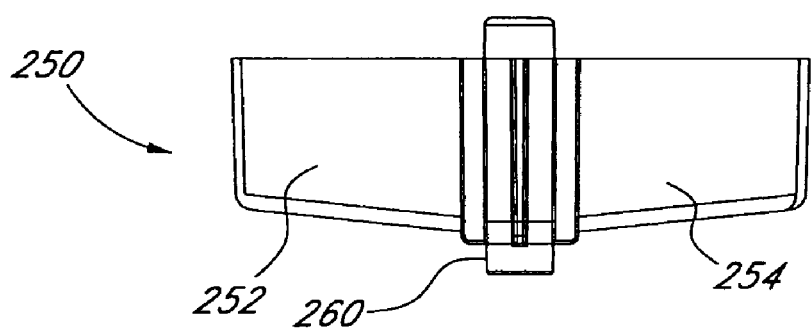
FIG. 20 is a top plan view of the pendulum.

A pendulum 250 preferably is pivotably suspended in one of the pockets 234 of the car seat 20, as illustrated in FIG. 18. As best illustrated in FIGS. 19 and 20, in the illustrated embodiment, the pendulum 250 is generally triangular in shape, having a first side 252, a second side 254, a bottom 256, and a face 258. An axle 260 having cylindrical ends is provided at the apex of the first and second sides 252, 254. Preferably, the pendulum 250 is molded from a plastic material having a bright color that contrasts with the color of the seat shell 22.

As illustrated in FIG. 19, an opening 280 is provided through the face 258 of the pendulum 250. The opening 280 generally includes a first region 282 at a first radial distance from the center of the axle 260 of the pendulum 250, and a second region 284 at a second radial distance from the center of the axle 260 greater than the first distance. The first region 282 is bounded by a first line $L_1$ extending through the center of the axle 260, and a second line $L_2$ extending through the center of the axle 260 at an angle α with respect to the first line $L_1$. In the illustrated embodiment, the angle α is approximately 9 degrees. The second region 284 is bounded by a third line $L_3$ extending through the center of the axle 260, and a fourth line $L_4$ extending through the center of the axle 260 at an angle β with respect to the third line $L_3$. In the illustrated embodiment, the angle β is approximately 16 degrees.

With reference again to FIG. 18, a rib 262 having generally U-shaped cutout 264 preferably extends upwardly into one of the pockets 234. An opening 266 is provided in one of the side walls 236, 238 across from the cutout 264. The pendulum 250 is pivotably supported in the cutout 264 and the opening 266.

As the car seat 20 is inclined or reclined, gravity causes the pendulum 250 to pivot within the pocket 234. In the illustrated embodiment, a first viewing area 290 and a second viewing area 292 are provided in the outer side wall 238 of the pocket 234. Preferably, the first and second viewing areas 290, 292 comprise openings in the outer side wall 238. The location of the first viewing area 290 is selected so that, when the angular orientation of the seat shell 22 is proper for an infant having a weight within a first weight range, the first region 282 of the opening 280 in the pendulum 250 is in registration with the first viewing area 290. As a result, the face 258 of the pendulum 250 is not visible in the first viewing area 290.

Figure 21:
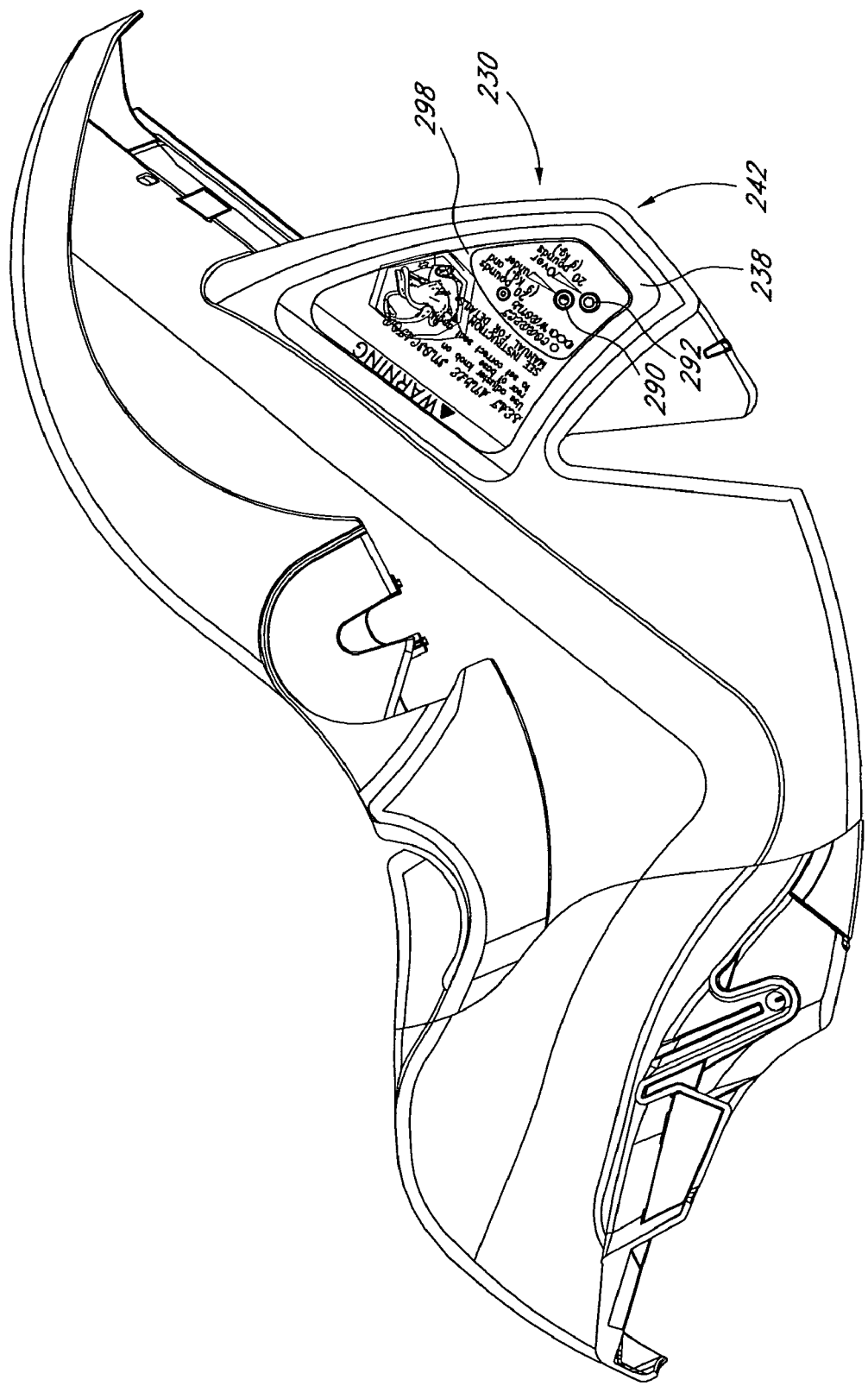
FIG. 21 is a left side view of the infant car seat with one of the viewing areas of the angle indicator of the car seat indicating an improper angular orientation of the car seat.

When the seat shell 22 is too inclined or too reclined for an infant having a weight within the first weight range, the pendulum 250 pivots in the pocket 234 so that at least a portion of the face 258 of the pendulum 250 is visible in the first viewing area 290, as illustrated in FIG. 21. Thus, by looking to see whether the face 258 of the pendulum 250 is visible in the first viewing area 290, it can be determined whether the angular orientation of the seat shell 22 is proper for transporting an infant having a weight within the first weight range.

Similarly, the location of the second viewing area 292 is selected so that, when the angular orientation of the seat shell 22 is proper for an infant having a weight within a second weight range, the second region 284 of the opening 280 in the pendulum 250 is in registration with the second viewing area 292. When the seat shell 22 is too inclined or too reclined for an infant having a weight within the second weight range, the pendulum 250 pivots in the pocket 234 so that at least a portion of the face 258 of the pendulum 250 is visible in the second viewing area 292. Accordingly, by looking to see whether the face 258 of the pendulum 250 is visible in the second viewing area 292, it can be determined whether the angular orientation of the seat shell 22 is proper for transporting an infant having a weight within the second weight range.

With reference still to FIG. 21, in the illustrated embodiment, a label 298 having instructions concerning the proper use of the angle indicator 230 is applied to the outer side wall 238. In illustrated embodiment, the label 298 indicates that the first viewing area 290 is to be used if the infant occupying the car seat 20 weighs less than 20 pounds, and the second viewing area 292 is to be used if the infant weighs more than 20 pounds.

Those of ordinary skill in the art will recognize that, by increasing or decreasing the angle α, the range of angular orientations of the seat shell 22 that the angle indicator 230 indicates as "proper" for a child having a weight within the first weight range (i.e., less than 20 pounds in the illustrated embodiment) can be increased or decreased, respectively. Similarly, by increasing or decreasing the angle β, the range of angular orientations of the seat shell 22 that the angle indicator 230 indicates as "proper" for a child having a weight within the second weight range (i.e., more than 20 pounds in the illustrated embodiment) can be increased or decreased, respectively.

It will be further recognized that the particular range of angular orientations of the seat shell 22 that the angle indicator 230 indicates as "proper" for a child having a weight within the first weight range depends on the particular sizes, shapes, and relative locations of the first viewing area 290 and the first region 282 of the opening 280 in the pendulum 250. Similarly, the particular range of angular orientations of the seat shell 22 that the angle indicator 230 indicates as "proper" for a child having a weight within the second weight range depends on the particular sizes, shapes, and relative locations of the second viewing area 292 and the second region 284 of the opening 280 in the pendulum 250.

It is to be understood that various modifications may be made to the angle indicator 230 of the illustrated embodiment. For example, in alternative embodiments, the angle indicator may include more than two viewing areas, and the opening in face of the pendulum may include more than two regions, to indicate the proper angular orientation of the seat shell for more than two different infant weight ranges. Instead of providing an opening in the face of the pendulum, a label may be affixed to the face of the pendulum. Preferably, the label would have a color that contrasts with the color of the surrounding face of the pendulum, so that the proper angular orientation of the seat shell could be determined based on the color that is visible through the appropriate viewing area.

Connection of Car Seat Base to Vehicle

Figure 22:
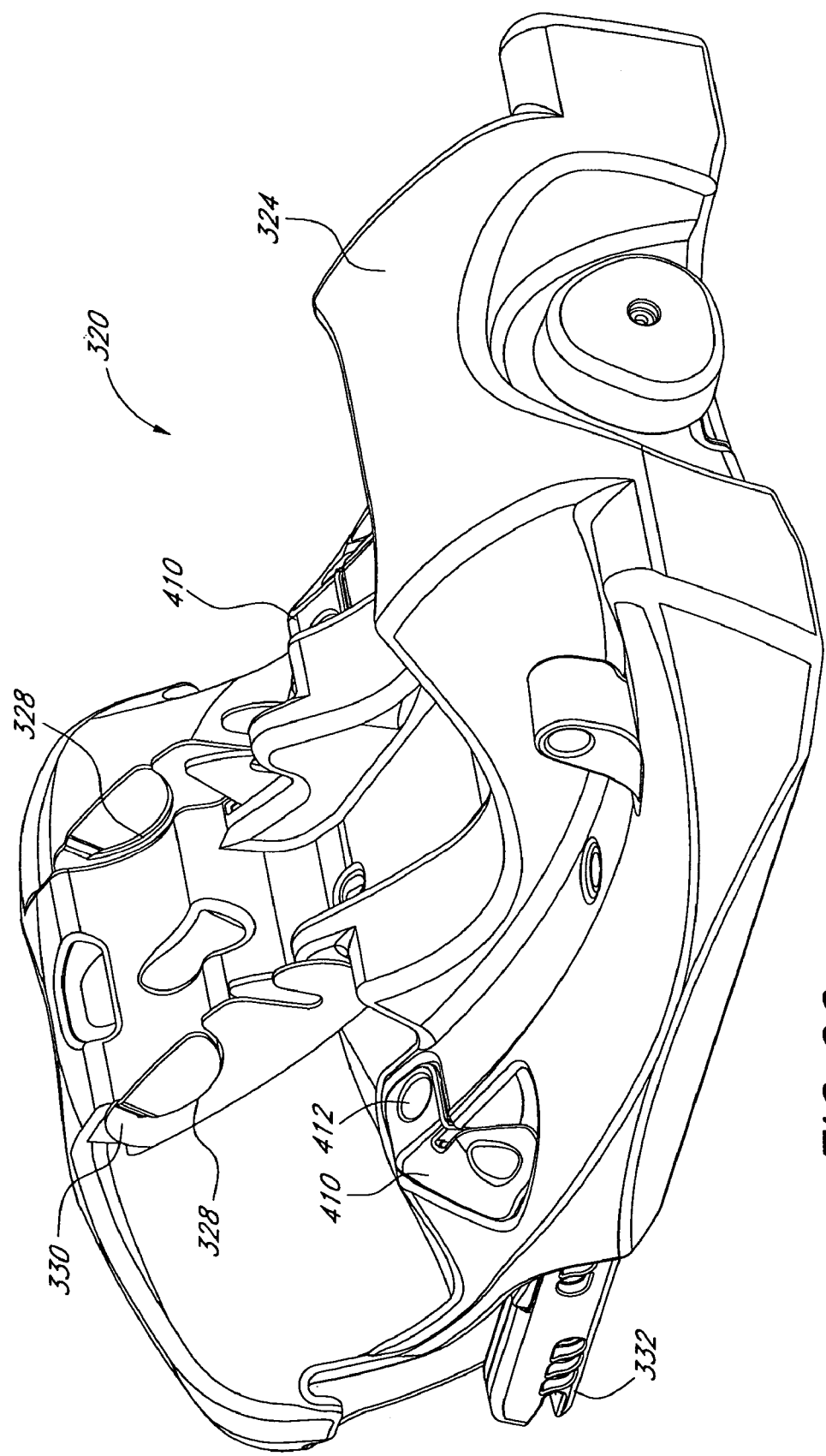
FIG. 22 is a perspective view of the top of a car seat base for use in connection with the infant car seat.

The infant car seat 20 can be positioned directly on the seat of a vehicle and secured to the vehicle seat by passing the vehicle seat belt through curved slots 304 (see FIG. 21) provided in the sides of the seat shell 22. Preferably, however, with reference to FIG. 22, a base 320 is provided for supporting the car seat 20 on the vehicle seat to allow the car seat 20 to be quickly installed and removed from the vehicle. In the illustrated embodiment, the base 320 includes a main body 324, preferably having a rigid, double-walled blow-molded construction. The base 320 can be secured to the vehicle seat by routing the vehicle seat belt (not shown) over the main body 324 and through a pair of curved slots 328 formed in a connection bracket 330 that extends upwardly from the main body 324. The curvature of the slots 328 serves to accommodate multiple entry angles of the seat belt resulting from the differing locations of the seat belt buckles in various vehicle makes and models.

If the vehicle in which the base 320 is situated is provided with universal anchors (not shown), the base is preferably connected to the anchors. The universal anchors comprise 6 mm pins, which typically are located near the junction of the vehicle seat bottom and the vehicle seat back. In the illustrated embodiment, latches 332 extend from an end of the main body 324 of the base for connection to the anchors. The latches 332 can be of any known type suitable for use in universal anchoring systems.

Figure 23:
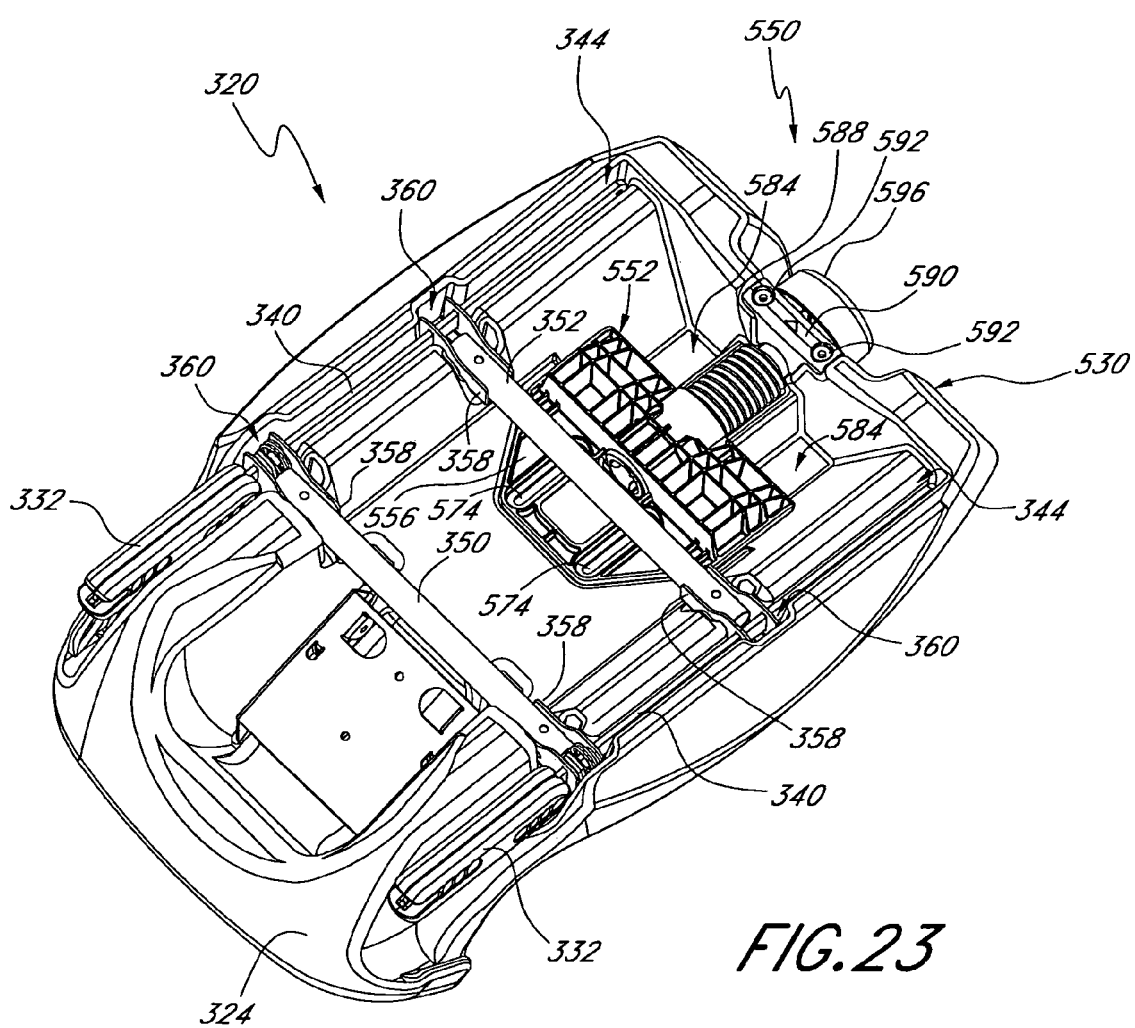
FIG. 23 is a perspective view of the bottom of the base with the foot portion of the base removed.

Government safety regulations dictate certain dimensional ranges for the locations of the anchors relative to one another and relative to the vehicle seat. Accordingly, the latches 332 preferably are movable relative to the main body 324 of the base 320 in order to accommodate the full dimensional ranges allowed under the regulations. With reference to FIG. 23, in the illustrated embodiment, each of the latches 332 is attached to an end of an elongated rail 340. The rails 340 reside in channels 344 formed along the sides of the base 320.

Figure 24:
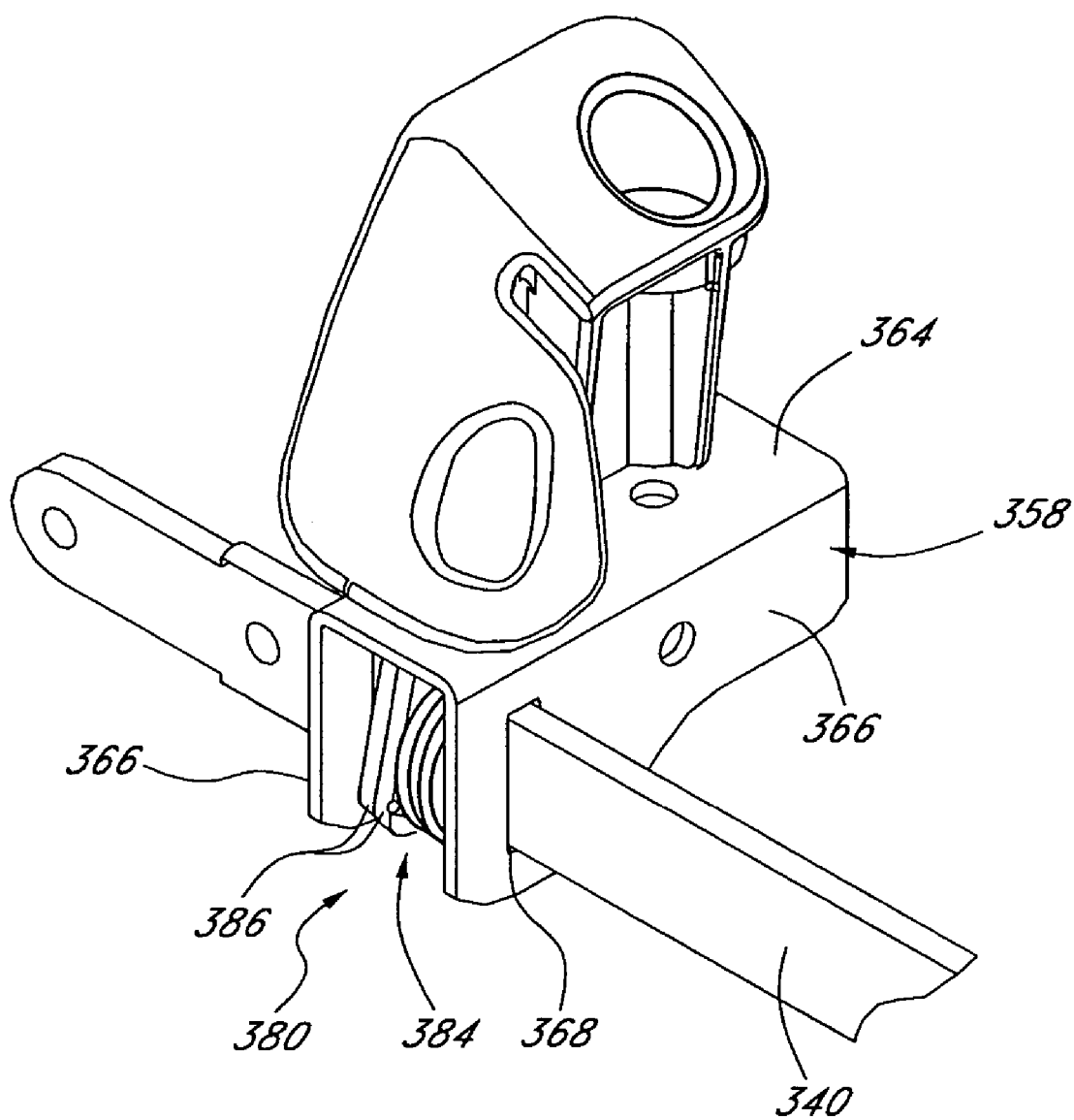
FIG. 24 is a perspective view of the one of the rails, rail guides and lock mechanisms of the base.
Figure 25:
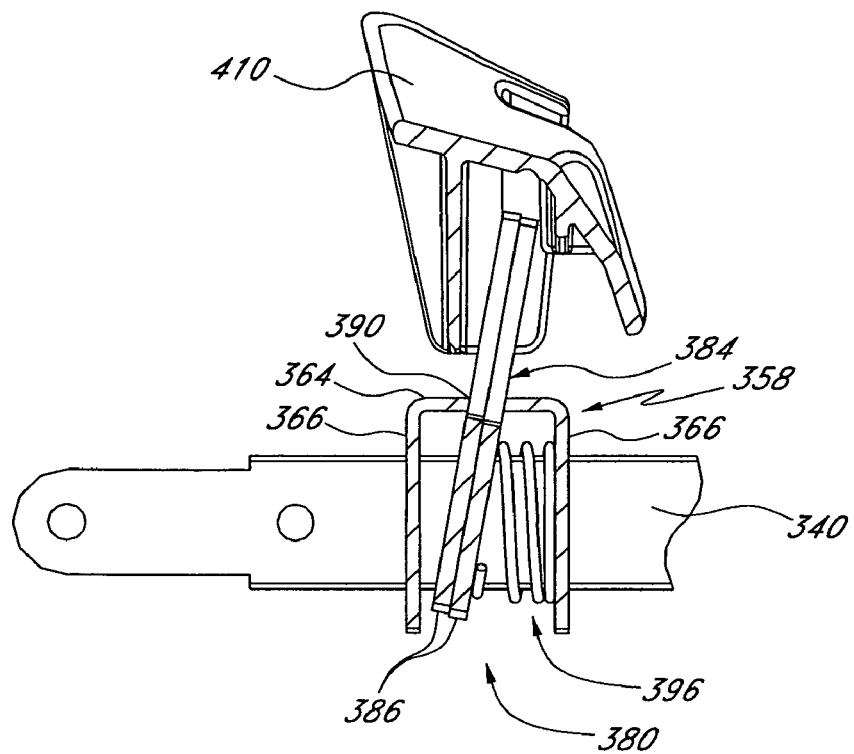
FIG. 25 is a cross-sectional view of the rail, rail guide and lock mechanism taken through the rail guide and lock mechanism.

In the illustrated embodiment, a first cross-member 350 and a second cross-member 352 extend laterally between the rails 340. A rail guide 358 is connected to each end of each of the cross-members 350, 352. The rail guides 358 reside in recesses 360 formed in the underside of the main body 324. As best illustrated in FIGS. 24 and 25, each of the rail guides 358 preferably has a generally U-shaped cross-section and includes a top wall 364 and two generally parallel side walls 366. The rails 340 extend through slots 368 provided in the side walls 366 of the rail guides 358.

Figure 26:
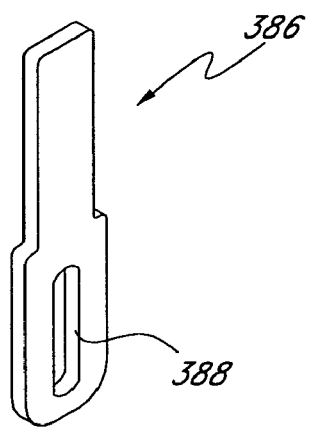
FIG. 26 is a perspective view of one of the lock stampings of the lock mechanism.

In the illustrated embodiment, a lock mechanism 380 is provided at each of the rail guides 358 of the first cross-member 350 to selectively lock the rails 340 in place relative to the rail guides 358. Each of the lock mechanisms 380 preferably includes a lock arm 384 comprising a pair of elongated stampings 386. As illustrated in FIG. 26, each of the stampings 386 has a longitudinally extending slot 388 in an end thereof. The height of the slot 388 preferably is slightly greater than the cross-sectional height of the rails 340.

The lock arms 384 preferably extend through openings 390 provided in the top walls 364 of the rail guides 358, as illustrated in FIG. 25. The rails 340 extend through the slots 388 at the ends of the lock arms 384. A coil spring 396 preferably is provided around each of the rails 340 between the lock arms 384 and the side walls 366 of the rail guides 358 opposite the latch 332 ends of the rails 340, forcing the ends of the lock arms 384 towards the side walls 366 adjacent the latches 332.

When the rails 340 are pulled away from the main body 324 of the base 320, the lock arms 384 tend to pivot against the top walls 364 of the rail guides 358 so that the lock arms 384 are more parallel to the rails 340. As a result, the lock arms 384 contact and "bite" into the top and bottom surfaces of the rails 340, thereby preventing the rails 340 from being further extended relative to the main body 324. When the rails 340 are pushed towards the main body 324, however, the lock arms 384 tend to pivot so that the lock arms 384 are more perpendicular to the rails 340, thereby better aligning the slots 388 at the ends of the lock arms 384 with the rails 340 passing through the slots 388. As a result, the lock arms 384 do not "bite" into the upper and lower surfaces of the rails 340 as the rails 340 are retracted towards the main body 324 of the base 320. Accordingly, in the illustrated embodiment, the lock mechanisms 380 lock the rails 340 in place to prevent the rails 340 from being extended relative to the main body 324 of the base, but allow the rails 340 to be retracted relative to the main body 324.

Figure 27:
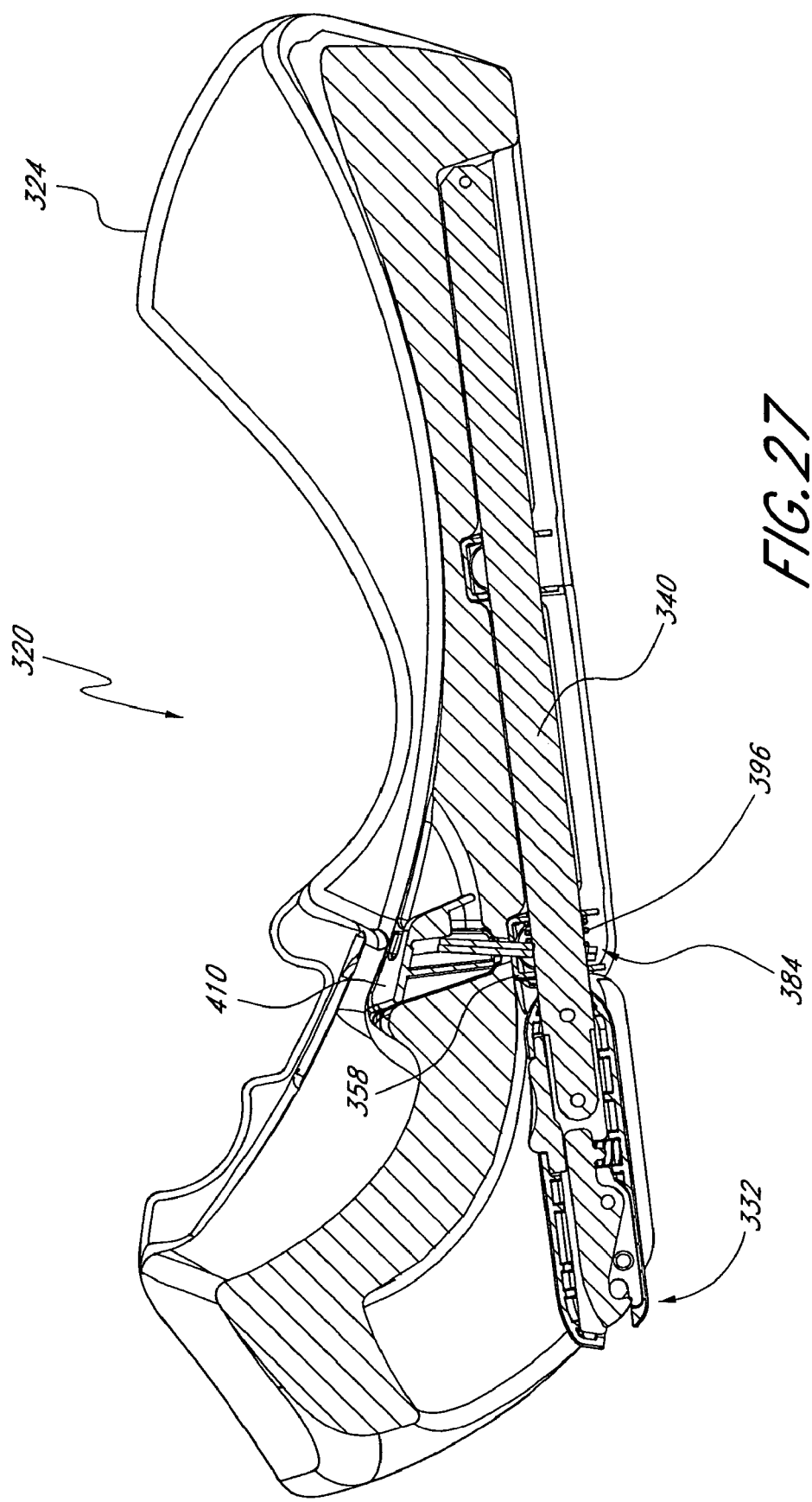
FIG. 27 is a cross-sectional view of the base taken through one of the rails.

With reference again to FIG. 22, in the illustrated embodiment, an actuator 410 is provided above each of the lock arms 384. The actuators 410 preferably are connected to the main body 324 of the base 320 by threaded fasteners (not shown) that extend into the main body 324 through openings 412 in the actuators 410. As best illustrated in FIGS. 25 and 27, the ends of the actuators 410 opposite the openings 412 contact the upper ends of the lock arms 384. When the ends of the actuators 410 are deflected towards the lock arms 384, the lock arms 384 pivot against the top walls 364 of the rail guides 358 so that the lock arms 384 are more perpendicular to the rails 340, thereby better aligning the slots 388 at the ends of the lock arms 384 with the rails 340 passing through the slots 388. As a result, the lock arms 384 do not "bite" into the upper and lower surfaces of the rails 340 when the actuators 410 are deflected, allowing the rails 340 to be extended from the channels 344. When the actuators 410 are released, the coil springs 396 force the ends of the lock arms 384 back towards the opposite side walls 366 of the rail guides 358 again to prevent the rails 340 from being further extended relative to the main body 324.

To install the base 320 in a vehicle, the actuators 410 preferably are actuated to allow the rails 340 to be extended from the main body 324 of the base 320. The actuators 410 are then released and the latches 332 are connected to the anchors of the vehicle. The main body 324 of the base 320 is then pressed towards the vehicle seat back, thereby retracting the rails 340 and preferably compressing the vehicle seat bottom beneath the main body 324. The lock mechanisms 380 and the vehicle seat back prevent movement of the main body 324 in the forward/aft directions.

Connection of Car Seat to Car Seat Base

Figure 28:
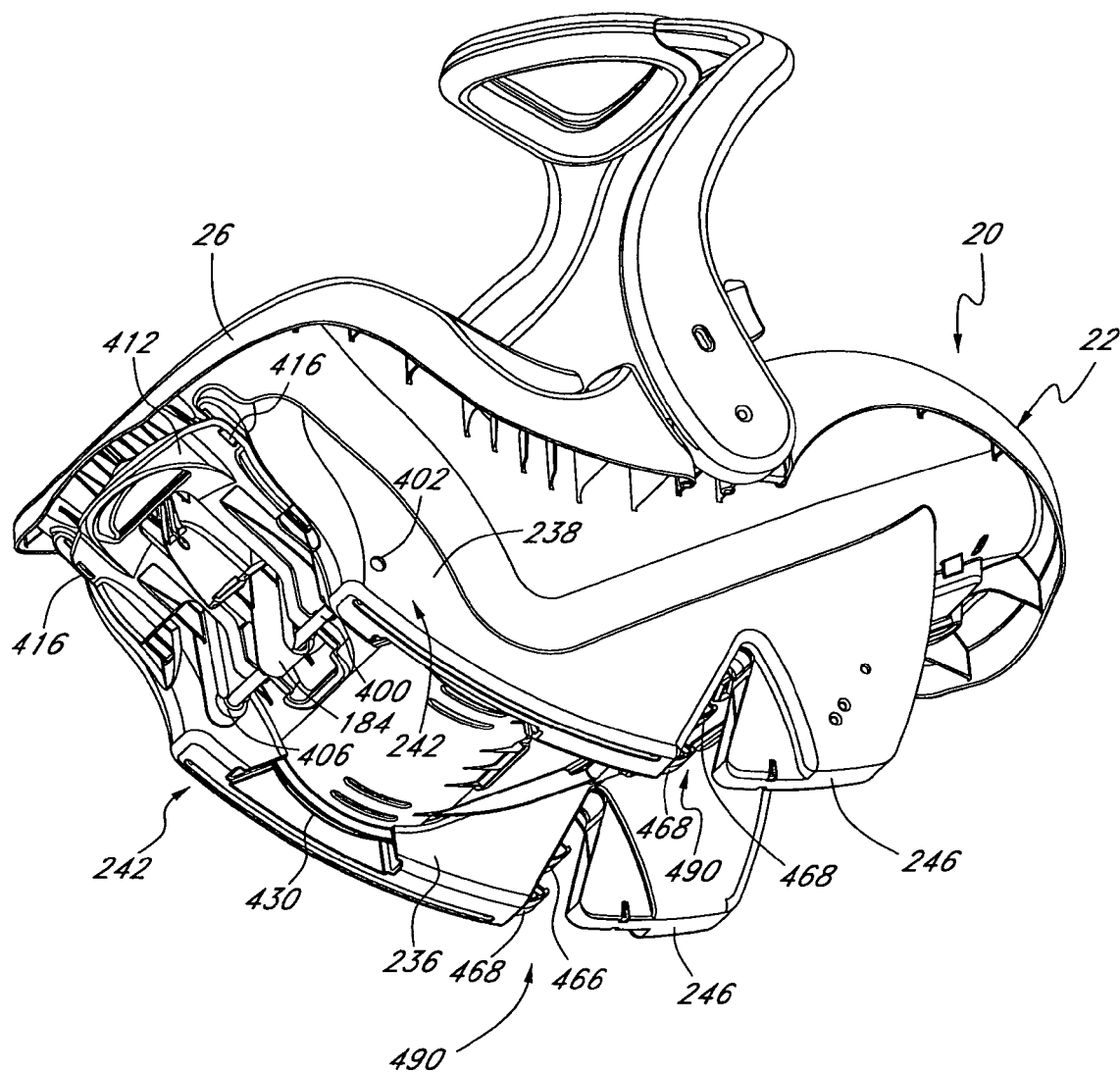
FIG. 28 is a perspective view of the bottom of the car seat.

With the base 320 secured to the vehicle seat by means of the vehicle seat belt or the latches 332, the car seat 20 can conveniently be connected to the base 320 to safely transport an infant. With reference to FIG. 28, in the illustrated embodiment, a connection rod 400 is installed in the seat shell 22 by inserting the rod 400 through openings 402 in the inner and outer side walls 236, 238 of one of the supports 242. The rod 400 is then passed through the bottom of the crotch belt pocket 184 and through an opening 406 in the inner wall 236 of the other support 242. Preferably, the crotch belt (not shown) is passed around the connection rod 400 to securely anchor the crotch belt to the seat shell 22.

Figure 29:
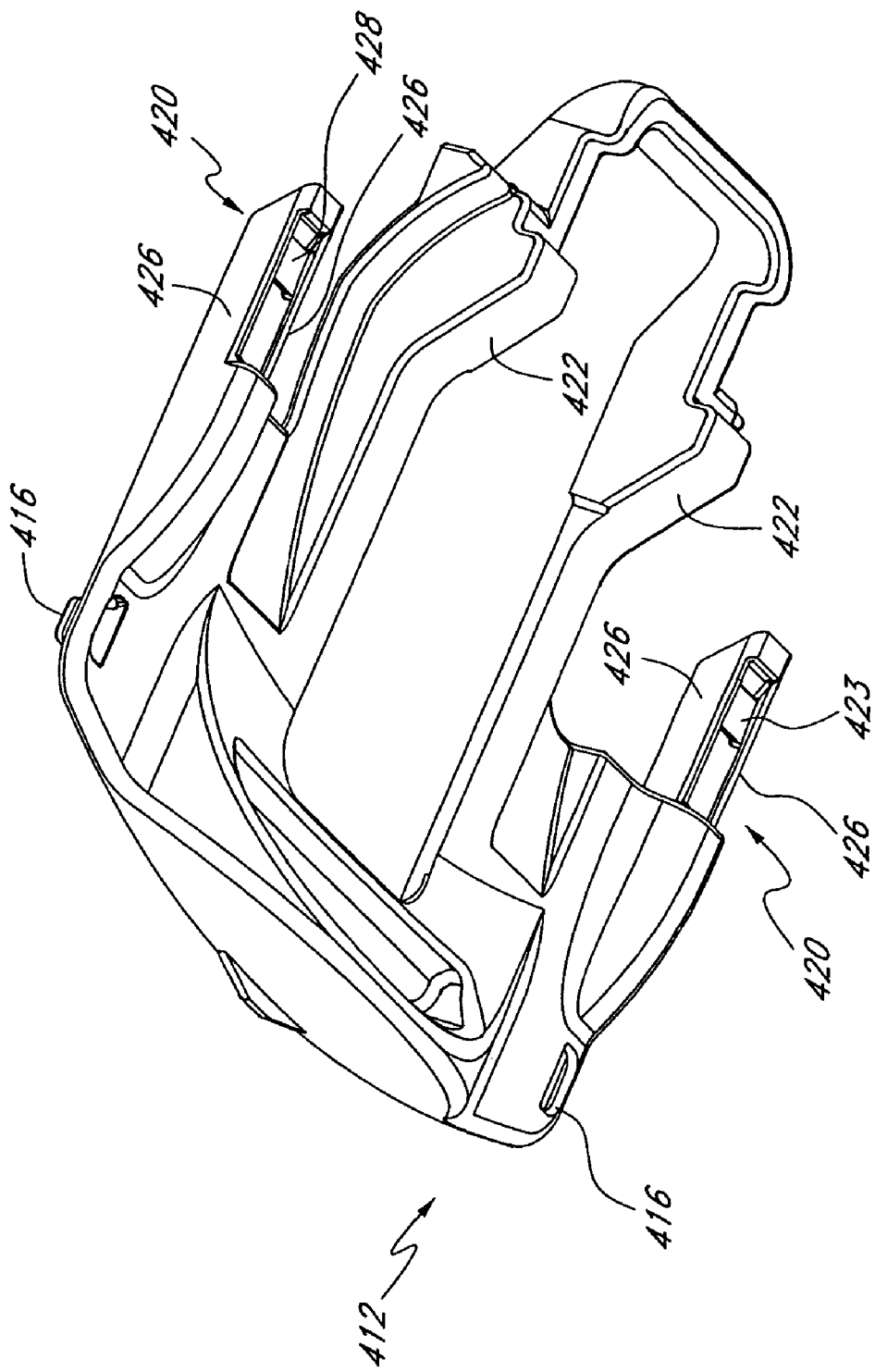
FIG. 29 is a perspective view of the bottom of the release handle of the car seat.

A release handle 412, illustrated in FIG. 29, preferably is slideably connected to the seat shell 22 near the foot end 26 thereof by a pair of hooks 416 that extend into slots (not shown) in the seat shell 22. As illustrated in FIG. 29, the release handle 412 preferably includes a pair of arms 420 and a pair of contact surfaces 422 located inwardly of the arms 420. In the illustrated embodiment, each of the arms 420 includes two generally parallel walls 426 and a web portion 428 that extends between the walls 426. A biasing member, such as a coil spring (not shown), biases the release handle 412 towards the head end 24 of the seat shell 22.

Figure 30:
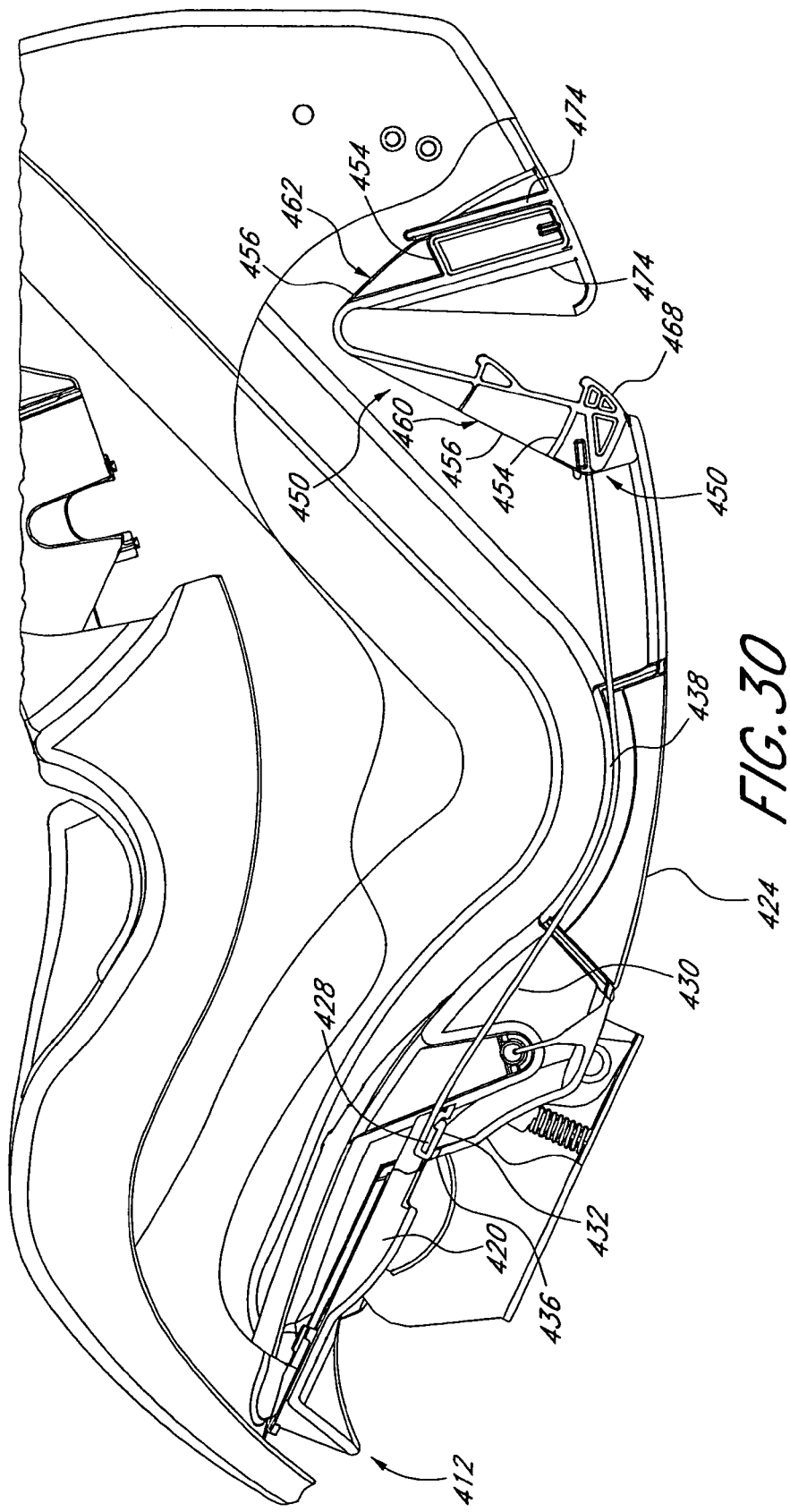
FIG. 30 is a left side view of the car seat with a portion of the left side cut away to illustrate the manner of operation of the release handle.

With reference to FIG. 30, a release strap 430 preferably is connected to each of the arms 420 of the release handle 412. The release straps 430 preferably have hooked ends 432 that extend around the web portions 428 of the arms 420. Each of the straps 430 extends through an opening 436 in one of the supports 242 and beneath a guide surface 438 towards the head end 24 of the seat shell 22.

As illustrated in FIG. 30, each of the straps 430 is connected at an end opposite the release handle 412 to a mounting hook 450. The mounting hooks 450 are preferably formed of acetyl or a similarly resilient material. In the illustrated embodiment, the mounting hooks 450 generally have an inverted "V" shape and include a number of ribs 454 and a central gusset 456 for reinforcement. Each of the mounting hooks 450 includes a first leg 460, to which the release strap 430 is connected, and a second leg 462. The first leg 460 includes an upper barb 466 and a lower barb 468 that extend towards the second leg 462. The second leg 462 is retained in place by ribs 474 extending from the support 242.

With reference again to FIG. 28, a slot 490, also having an inverted "V" shape, extends upwardly from the bottom surface 246 of each of the supports 242. In FIG. 28, the upper and lower barbs 466, 468 of the mounting hooks 450 protrude into the slot 490. When the release handle 412 is moved towards the foot end 26 of the seat shell 22, the release straps 430 pull the first legs 460 of mounting hooks 450 away from second legs 462, so that the upper and lower barbs 466, 468 no longer protrude into slots 490. When the handle 412 is released, the mounting hooks 450 resiliently return to their original positions.

Figure 31:
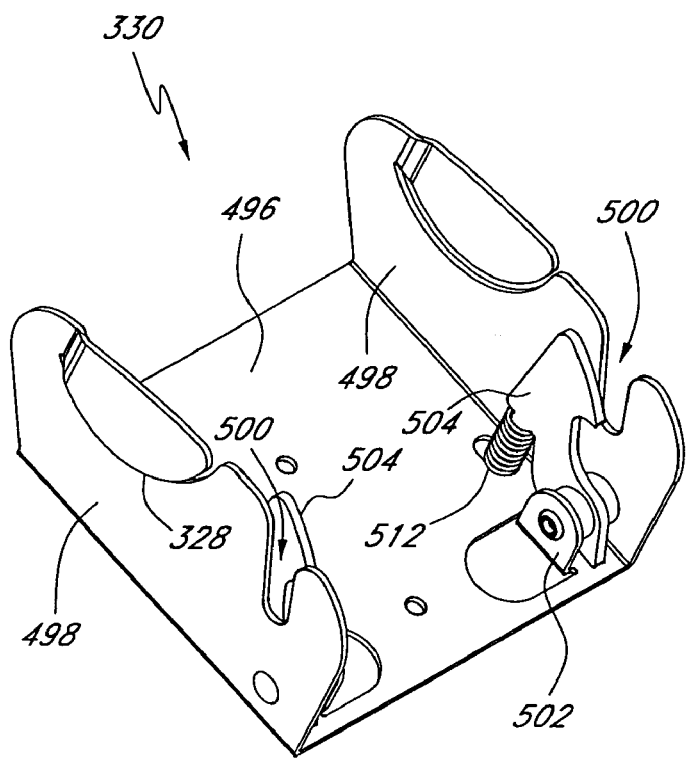
FIG. 31 is a perspective view of the connection bracket of the base.
Figure 32:
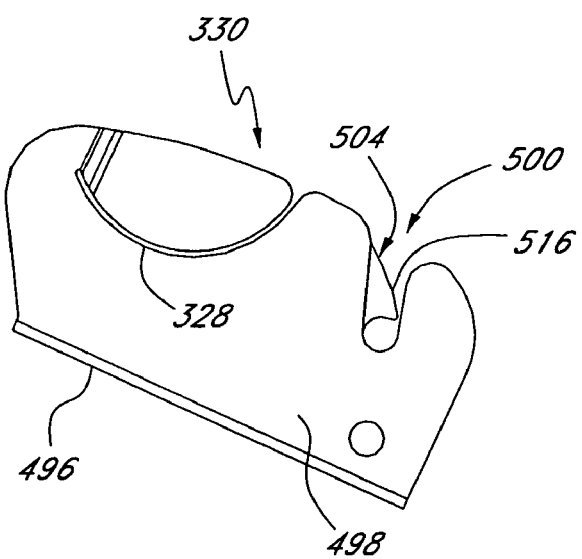
FIG. 32 is a left side view of the connection bracket.

With reference now to FIGS. 31 and 32, in the illustrated embodiment, the connection bracket 330 includes a central portion 496 and two side walls 498 that extend in a direction generally perpendicular to the central portion 496. A slot 500 is provided in each of the side walls 498 near the curved seat belt slots 328. A tab 502 extends upwardly from the central portion 496 adjacent each of the side walls 498. A pawl 504 is pivotably connected between each tab 502 and the adjacent side wall 498. A biasing spring 512 biases a hooked end portion 516 of each pawl 504 away from the central portion 498 so that, when viewed from the perspective of FIG. 32, the hooked portion 516 extends across the slot 500.

Figure 33:
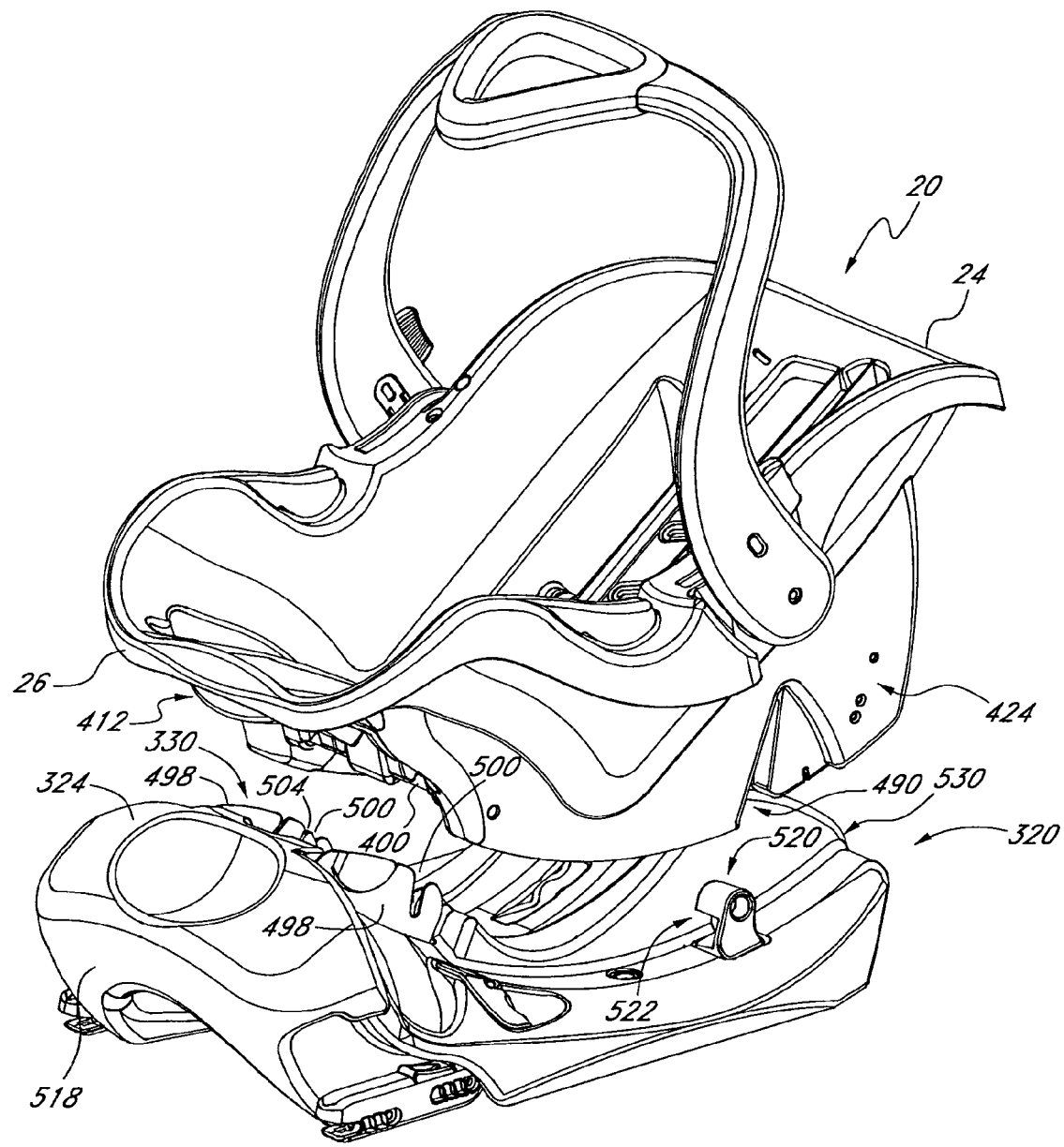
FIG. 33 is a perspective view of the car seat and base.

With reference now to FIG. 33, the side walls 498 and the pawls 504 of the connection bracket 330 extend upwardly through the main body 324 of the base 320 near a foot end 518 of the base 320. As the foot end 26 of the infant car seat 20 is lowered onto the base 320, the connection rod 400 is aligned with and lowered into the slots 500 in the connection bracket 330. The connection rod 400 contacts and deflects the pawls 504 away from the slots 500 as it passes downwardly into the slots 500. When the connection rod 400 reaches the bottom of the slots 500, the biasing springs 512 bias the pawls 504 back towards the slots 500 so that the hooked portions 516 of the pawls 504 extend over the rod 400, thereby retaining the rod 400 in the slots 500.

Figure 34:
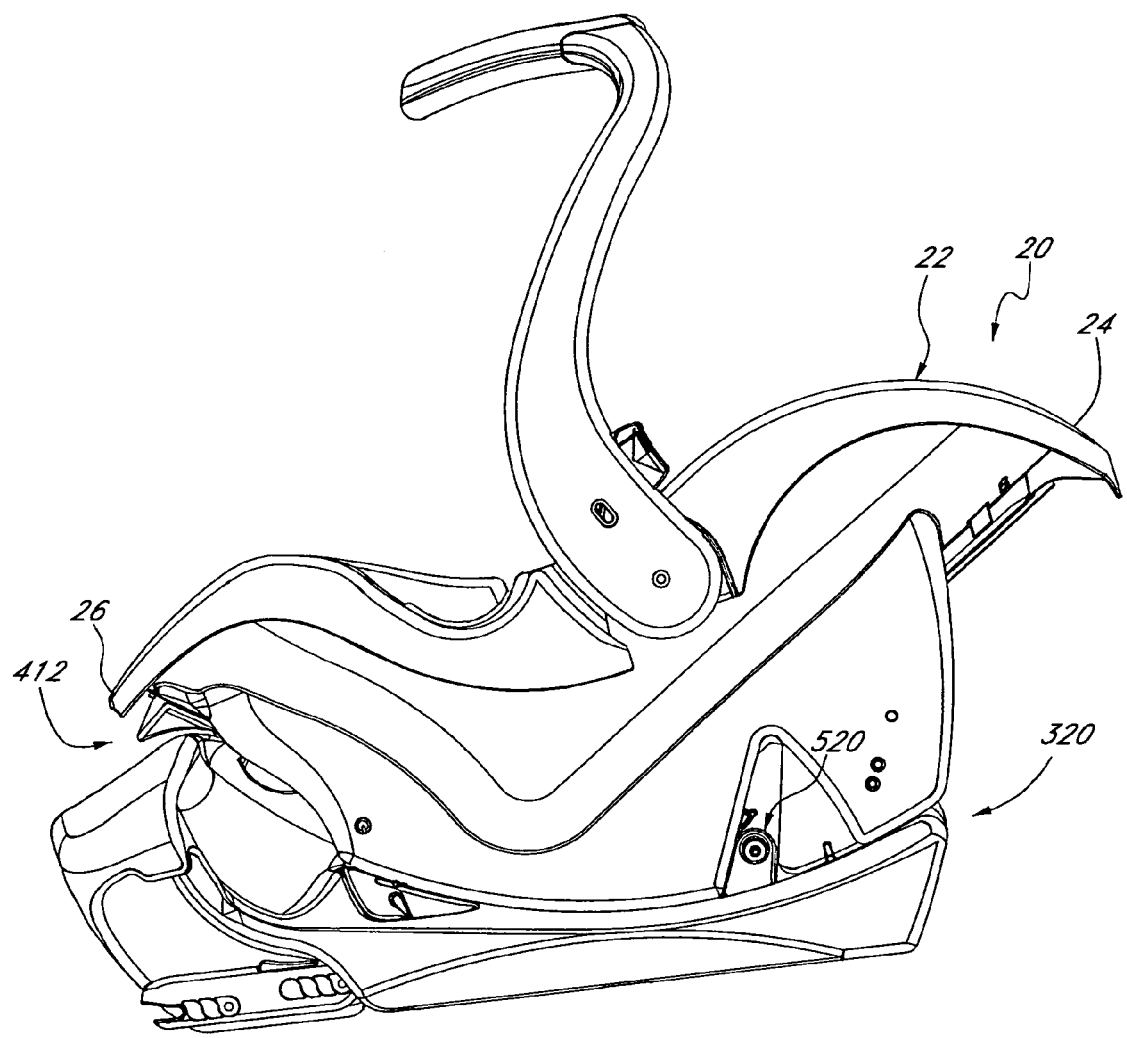
FIG. 34 is a left side view of the car seat and base with the car seat connected to the base.

With reference still to FIG. 33, in the illustrated embodiment, a mount 520 having a rounded top and a notch 522 in a side thereof is located on each side of the base 320 near a head end 530 of the base 320. As the head end 24 of the car seat 20 is lowered onto the base 320, the slots 490 in the supports 424 of the car seat 20 are aligned with the mounts 520. The mounts 520 contact the lower barbs 468 of the mounting hooks 450 (not visible in FIG. 33), thereby deflecting the first legs 460 of the mounting hooks 450 away from the second legs 462. When the car seat 20 is fully lowered onto the base 320, as illustrated in FIG. 34, the lower barbs 468 are aligned with the notches 522 in the sides of the mounts 520. The first legs 460 of the mounting hooks 450 resiliently return towards the second legs 462 so that the lower barbs 468 extend into the notches 522. The lower barbs 468 abut the tops of the notches 522, thereby locking the head end 24 of the car seat 20 to the base 320.

To release the car seat 20 from the base 320, the release handle 412 is moved towards the foot end 26 of the seat shell 20. As the handle 412 is moved towards the foot end 26, the contact surfaces 422 (see FIG. 29) of the handle 412 contact the pawls 504 of the connection bracket 330 (see FIG. 31). The pawls 504 are rotated away from the slots 500 in the bracket 330 so that hooked portions 516 of the pawls 504 do not extend over connection rod 400. At the same time, the movement of the release handle 412 pulls the release straps 430 (see FIG. 30) towards the foot end 26 of the seat shell 20, thereby pulling the first legs 460 of mounting hooks 450 away from second legs 462 so that the lower barbs 468 do not extend into the notches 522 in the mounts 520. The car seat 20 can then be lifted off of the base 320.

Angular Adjustment of Car Seat Base and Car Seat

Figure 35:
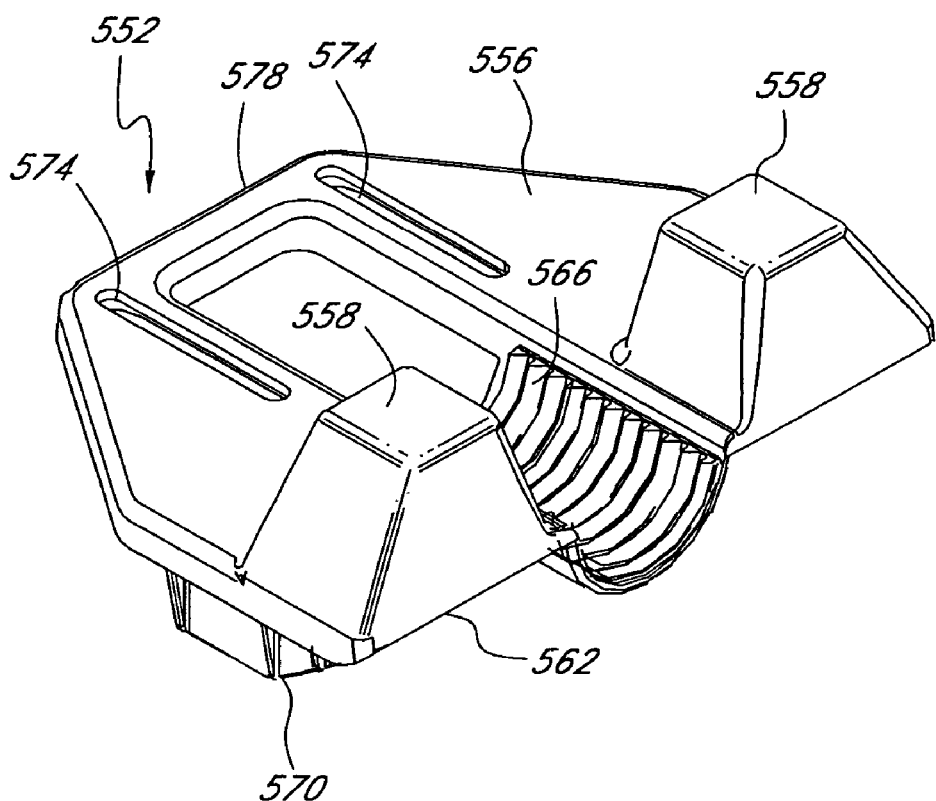
FIG. 35 is a perspective view of the lifter of the base.
Figure 36:
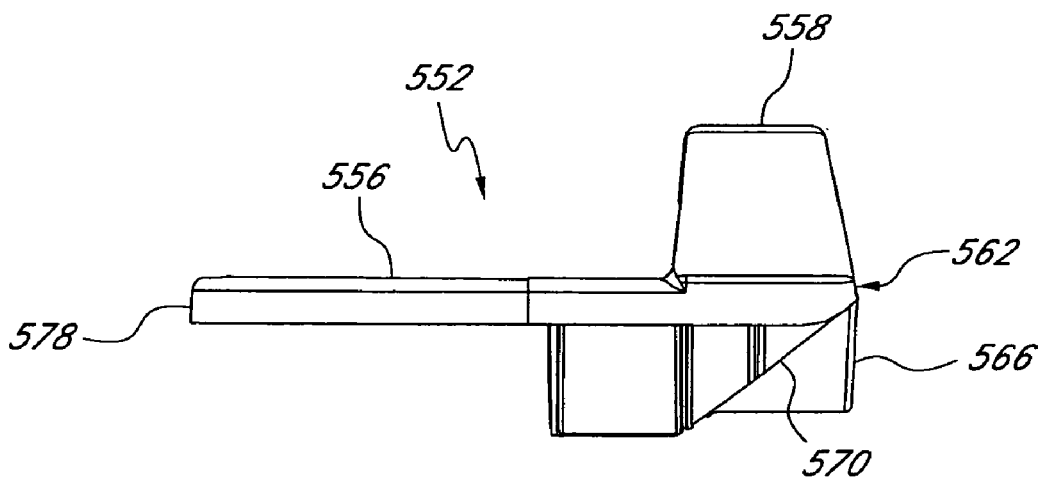
FIG. 36 is a left side view of the lifter.

With reference again to FIG. 23, in the illustrated embodiment, the base 320 has an angular adjustment mechanism 550 including a lifter 552. The lifter 552, illustrated in FIGS. 35 and 36, includes a generally planar portion 556 and projections 558 that extend upwardly from a first end 562 of the planar portion 556. A threaded recess 566 extends between the projections 558. A bearing surface 570, preferably comprising a generally convex surface, slopes downwardly away from the planar portion 556 from the first end 562 thereof. Slots 574 are provided in the planar portion 556 near a second end 578 thereof.

As illustrated in FIG. 23, the lifter 552 preferably is slideably connected to the underside of the main body 324 of the base 320 by fasteners (not shown) that extend through the slots 574 in the planar portion 556. The projections (not visible in FIG. 23) extend into channels 584 formed in the underside of the main body 324. An adjustment screw 588 extends into the threaded recess 566 of the lifter 552 from the head end 530 of the base. The screw 588 is rotatably connected to the main body 324 by a retainer 590 that extends over the screw 588 and is connected to the main body 324 by a pair of fasteners 592. An adjustment knob 596 is connected to an end of the screw 588. The screw 588 mates with the threaded recess 566 of the lifter 552 so that, by turning the adjustment knob 596, the lifter 552 can be drawn towards or away from the head 530 end of the base 320.

Figure 37:
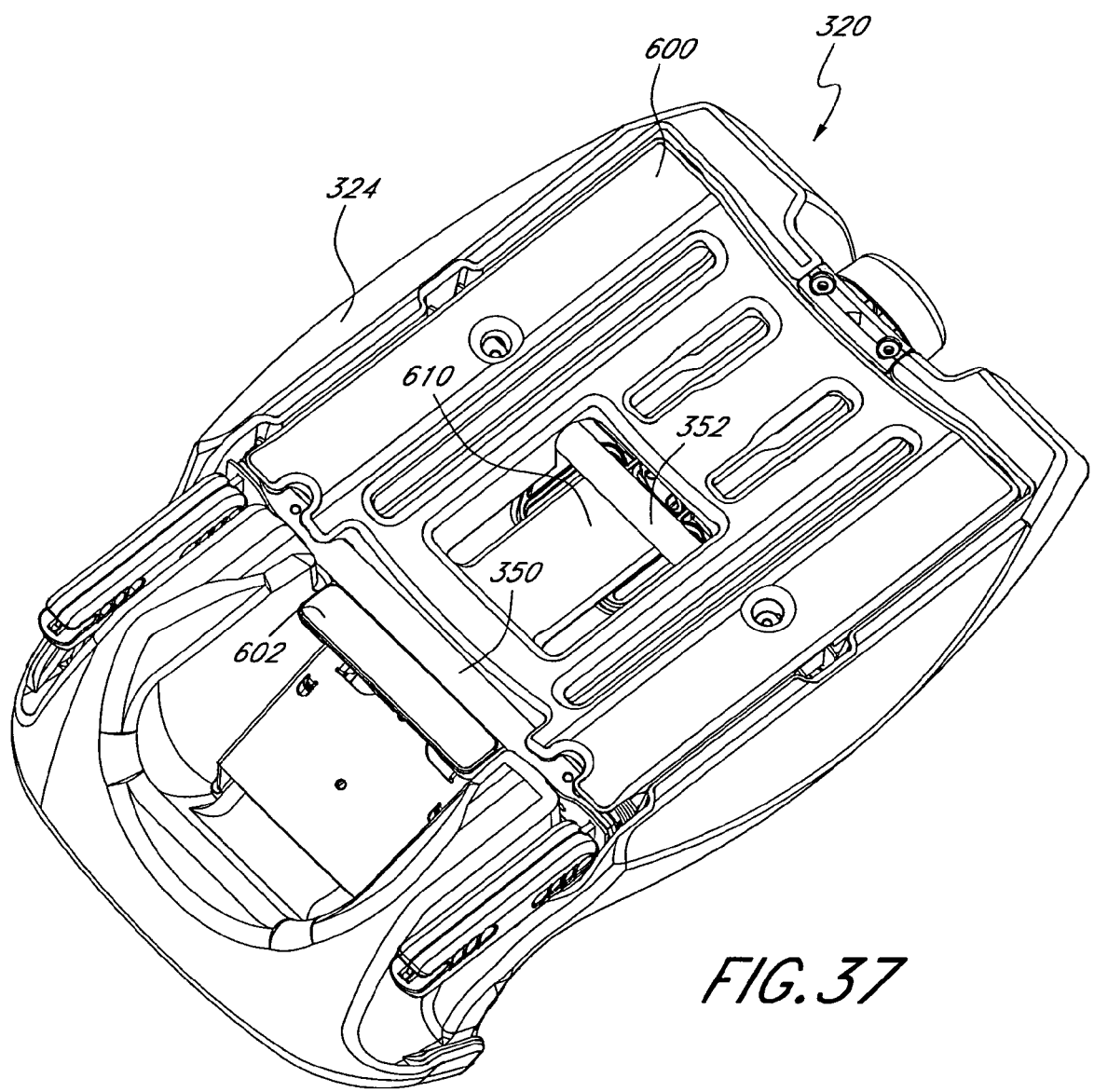
FIG. 37 is a perspective view of the bottom of the base.
Figure 38:
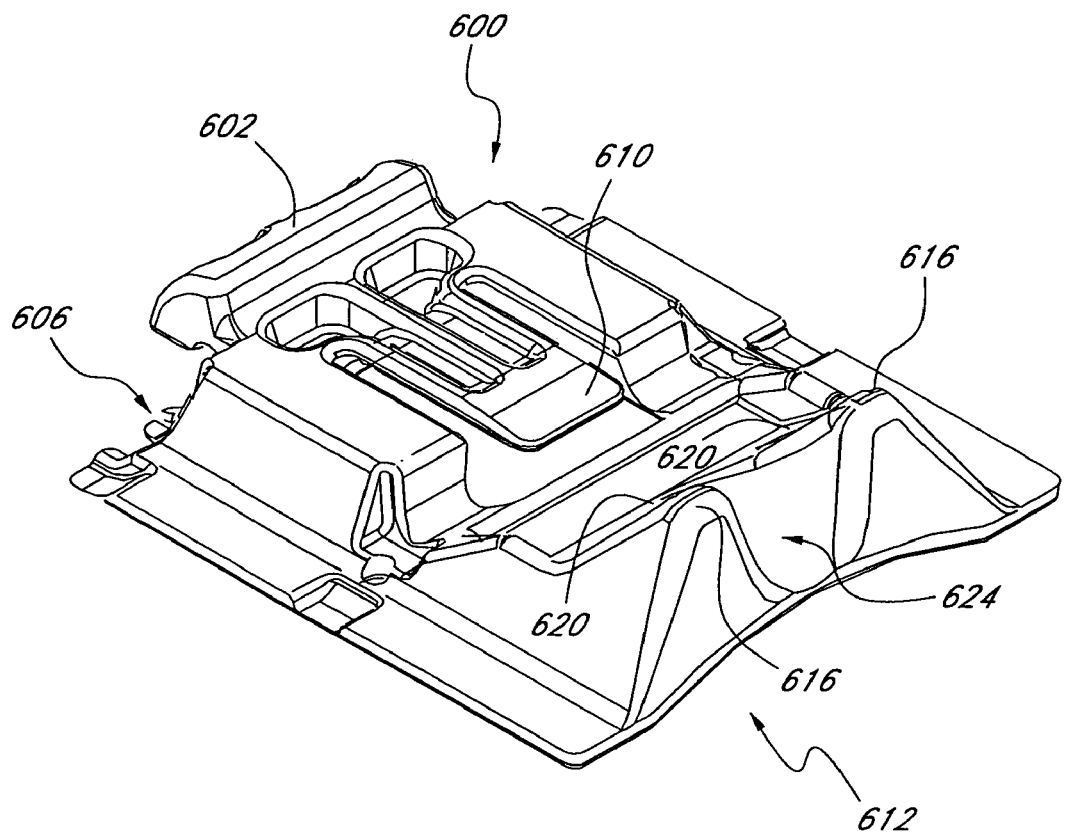
FIG. 38 is a perspective view of the foot portion of the base.
Figure 39:
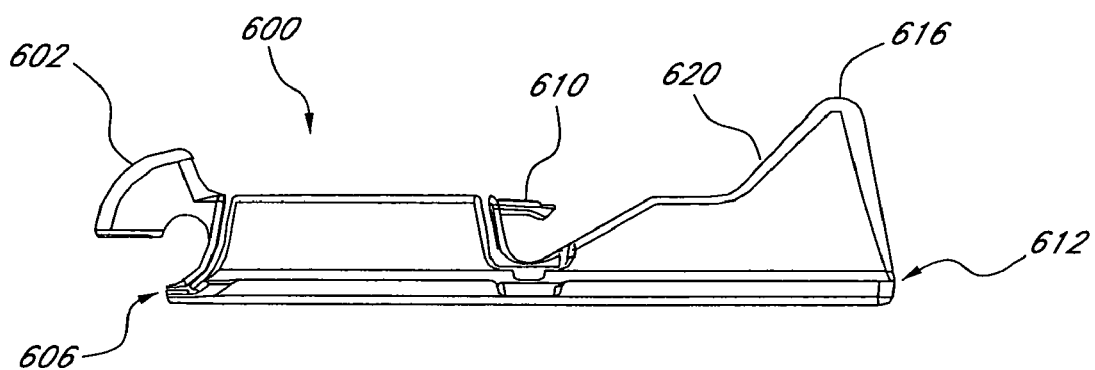
FIG. 39 is a left side view of the foot portion.

With reference now to FIG. 37, in the illustrated embodiment, the base 320 includes a foot portion 600 at the underside thereof. The foot portion 600, illustrated in FIGS. 38 and 39, has an extension 602 that overhangs a first end 606 of the foot portion 600, and a cantilever spring 610 that extends from the first end 606 towards a second end 612 of the foot portion 600. In the illustrated embodiment, projections 616 extend upwardly from the second end 612 of the foot portion 600. Each of the projections 616 defines a bearing surface 620, preferably comprising a generally concave surface corresponding to the generally convex bearing surface 570 of the lifter 552, that slopes upwardly towards the second end 612. A recess 624 preferably is formed between the projections 616 for passage of the adjustment screw 588.

As illustrated in FIG. 37, the extension 602 at the first end 606 of the foot portion 600 is retained under the first cross-member 350 between first cross-member 350 and the main body 324 of the base 320. The cantilever spring 610 extends under the second cross-member 352 between the second cross-member 352 and the main body 324.

Figure 40:
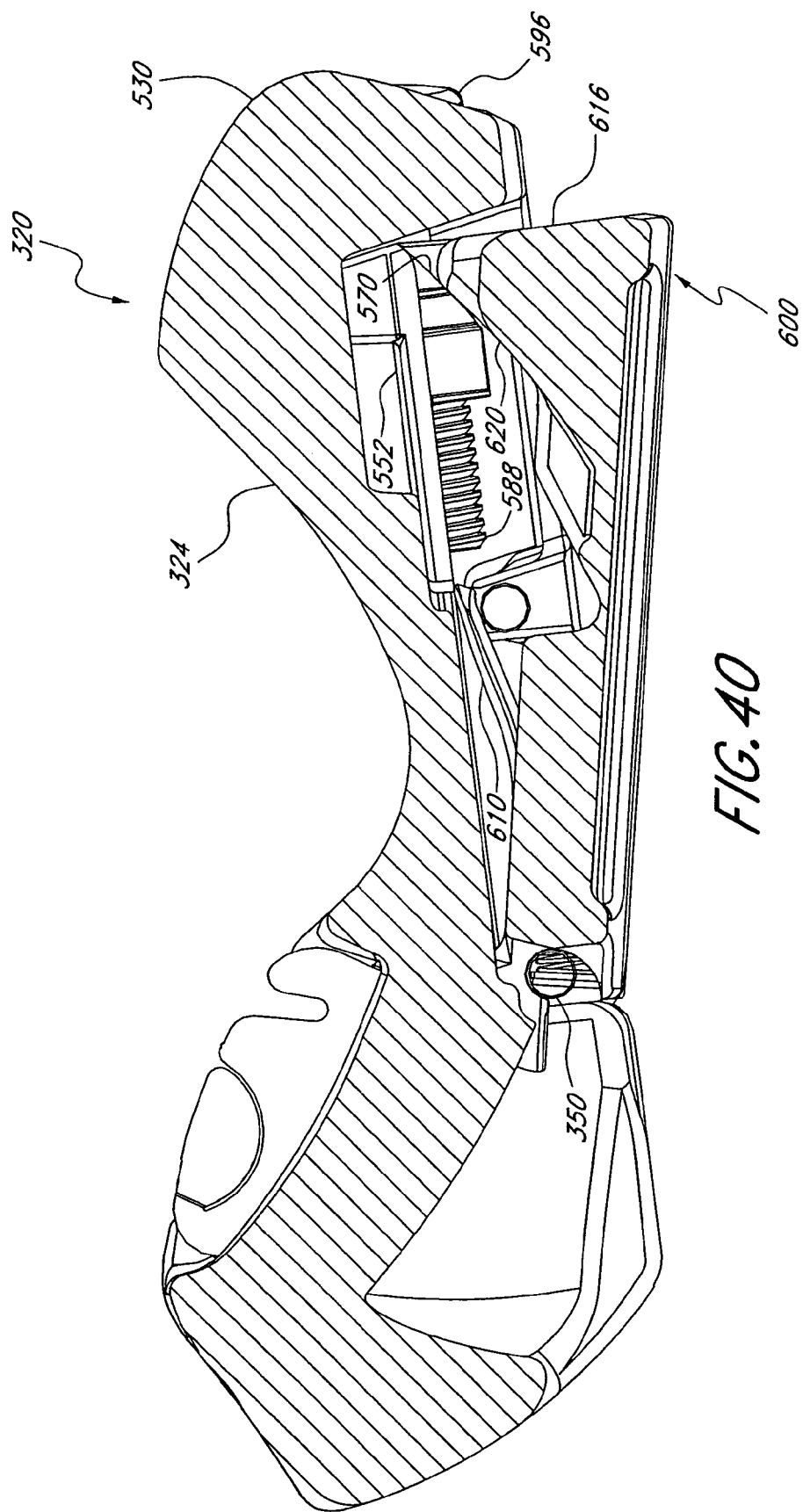
FIG. 40 is a cross-sectional view of the base taken alongside one of the side walls of the connection bracket.

With reference now to FIG. 40, in the illustrated embodiment, the foot portion 600 is pivotable about the first cross-member 350 relative to the main body 324. When the screw 588 is turned in a first direction, the lifter 552 is drawn towards the head end 530 of the base 320. The bearing surface 570 of the lifter 552 rides over the bearing surfaces 620 of the projections 616. If the foot portion 600 is supported on a surface, such as a vehicle seat, the head end 530 of the main body 324 is lifted relative to the foot portion 600, thus changing the angular orientation of the main body 324. The cantilever spring 610 is deflected as the head end 530 of the main body 324 is lifted relative to the foot portion 600.

When the screw 558 is turned in the opposite direction, the lifter 552 is moved away from the head end 530 of the base 320. The bearing surface 570 of the lifter 552 slides down the bearing surfaces 620 of the projections 616. The cantilever spring 610 assists gravity to force the head end 530 of the main body 324 downwardly towards the foot portion 600.

Accordingly, by rotating the adjustment knob 596, it is possible to adjust the angular orientation of the main body 324 of base 320, and therefore the angular orientation of the car seat 20 when the car seat 20 is connected to the base 320. In contrast to some existing systems, the angular adjustment mechanism 550 is provided at the head end 530 of the base 320, opposite the vehicle seat back, making it more convenient to reach and operate. The adjustment knob 596 preferably is turned until the angle indicator 230 of the car seat 20 indicates that the orientation of the seat shell 22 is proper for the weight of the infant occupying it.

Connection of Car Seat to Stroller

Figure 41:
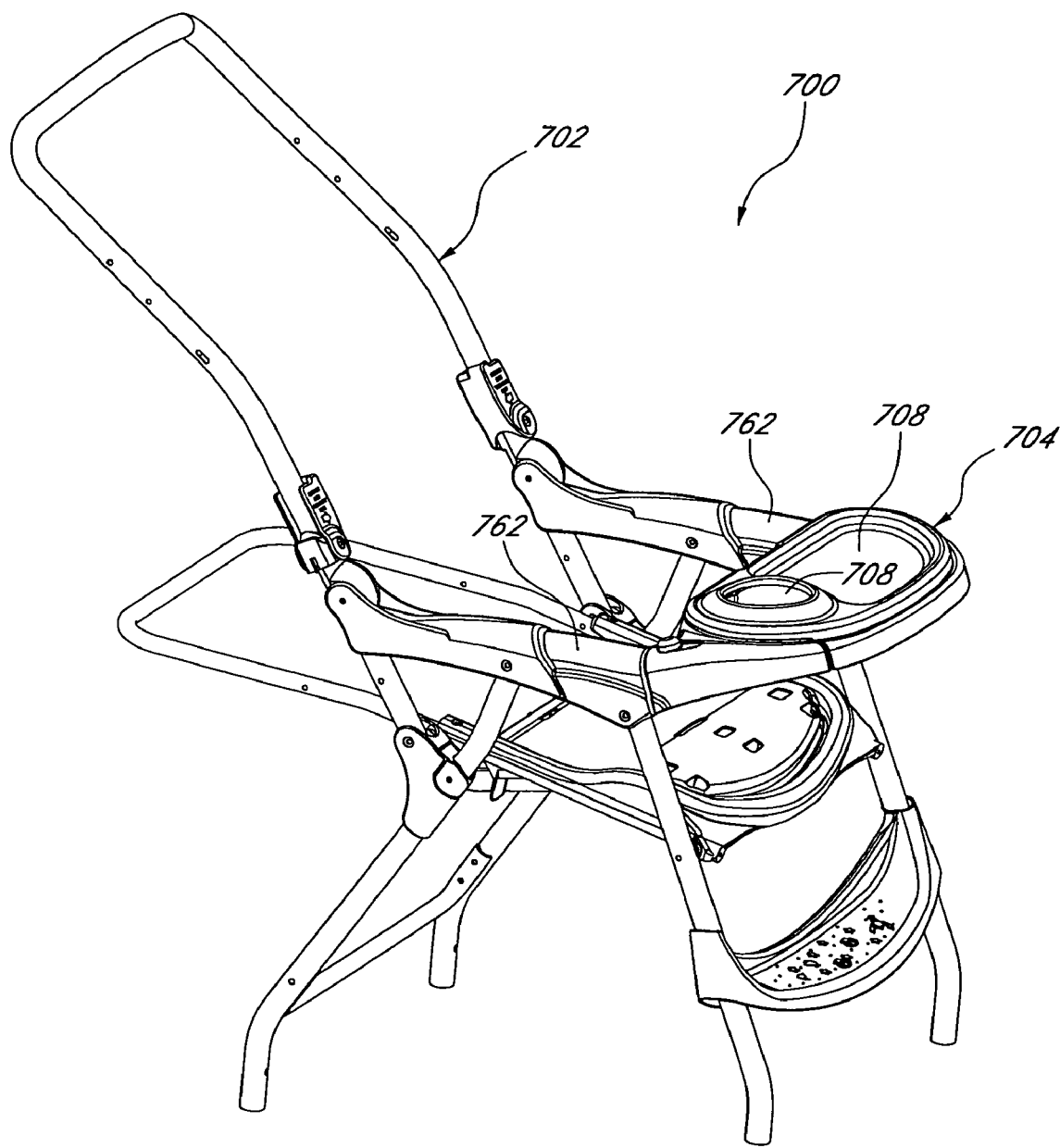
FIG. 41 is a perspective view of a stroller for use in connection with the car seat.
Figure 42:
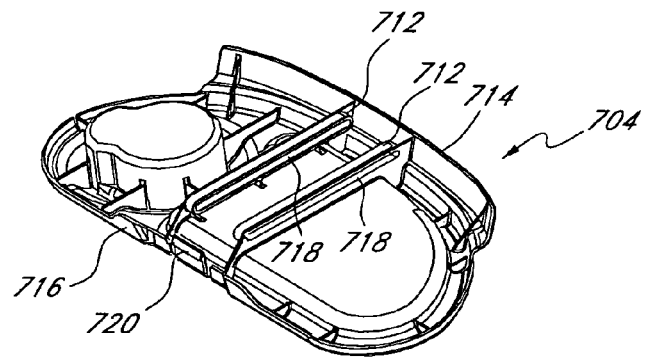
FIG. 42 is a perspective view of the bottom of the tray of the stroller.

With reference now to FIG. 41, the car seat 20 preferably can be connected to a stroller 700 which, in the illustrated embodiment, includes a stroller frame 702 and a stroller tray 704 that traverses the stroller frame 702. The stroller tray 704 preferably includes recessed areas 708 for supporting items such as drink cups, food and toys. As illustrated in FIG. 42, the underside of the tray 704 preferably includes runners 712 that extend from a front 714 of the tray 704 to a rear 716 of the tray 704. Each of the runners 712 defines an elongated slot 718. A lock 720 is provided at the rear of the tray 704 between the runners 712.

Figure 43:
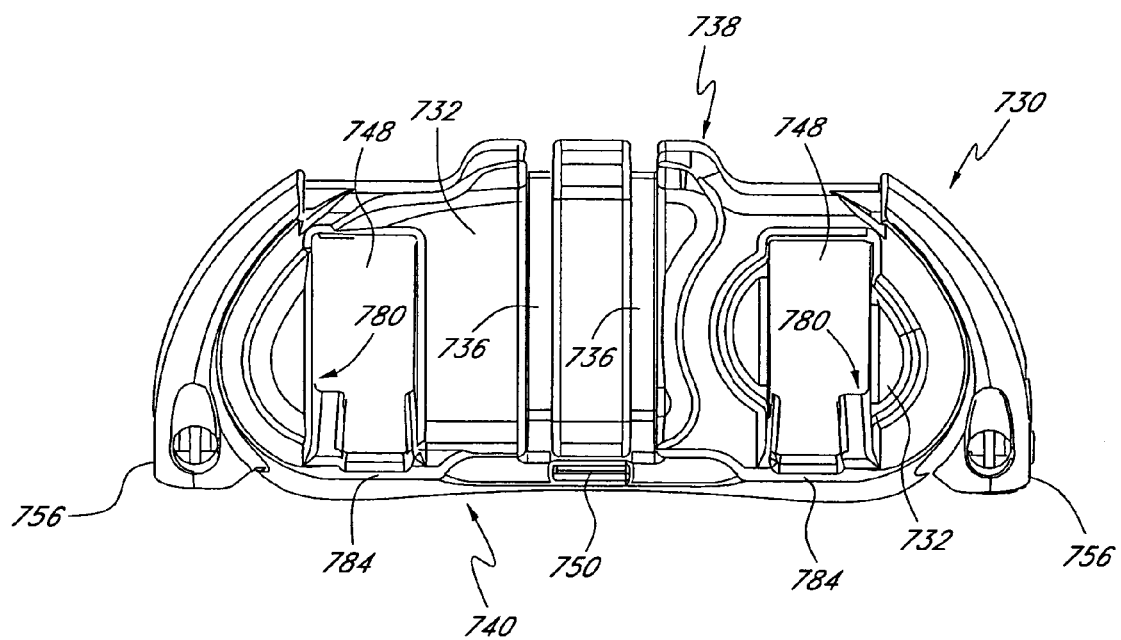
FIG. 43 is a top plan view of the tray bar of the stroller.

The stroller tray 704 preferably is supported by a tray bar 730. As illustrated in FIG. 43, the tray bar 730 preferably includes recesses 732 that correspond to the recessed areas 708 in the tray 704. Channels 736 extend from a front 738 of the tray bar 730 to a rear 740 of the tray bar 730 to accommodate the runners 712 of the tray 704. An opening 748 is provided through the tray bar 730 on each side of the channels 736. A lock opening 750 is provided at the rear 740 of the tray bar 730 between the channels 736.

Figure 44:
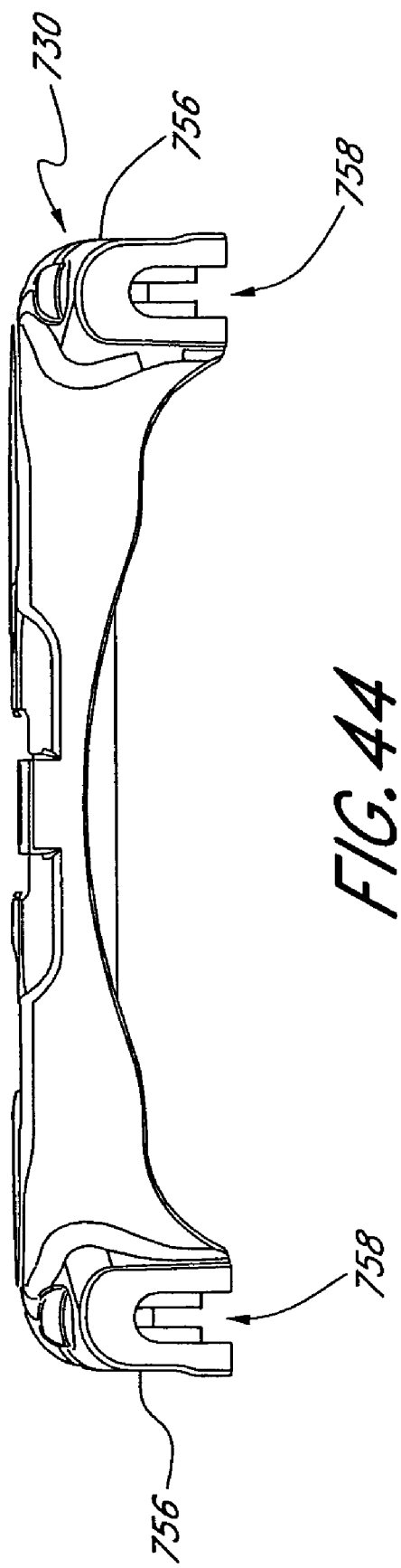
FIG. 44 is a rear elevational view of the tray bar.

The tray bar 730 may be adapted to be connected to the stroller frame 702 in any suitable manner. In the illustrated embodiment, the tray bar 730 includes an arm portion 756 at each side thereof. A vertical slot 758 is provided at the end of each arm portion 756, as illustrated in FIG. 44. The arm portions 756 slide over fingers (not shown) extending from the arms 762 (see FIG. 41) of the stroller. The fingers extend through the slots 758 in the arm portions 756 and cooperate with the arm portions 756 to lock the tray bar 730 to the stroller 700.

Figure 45:
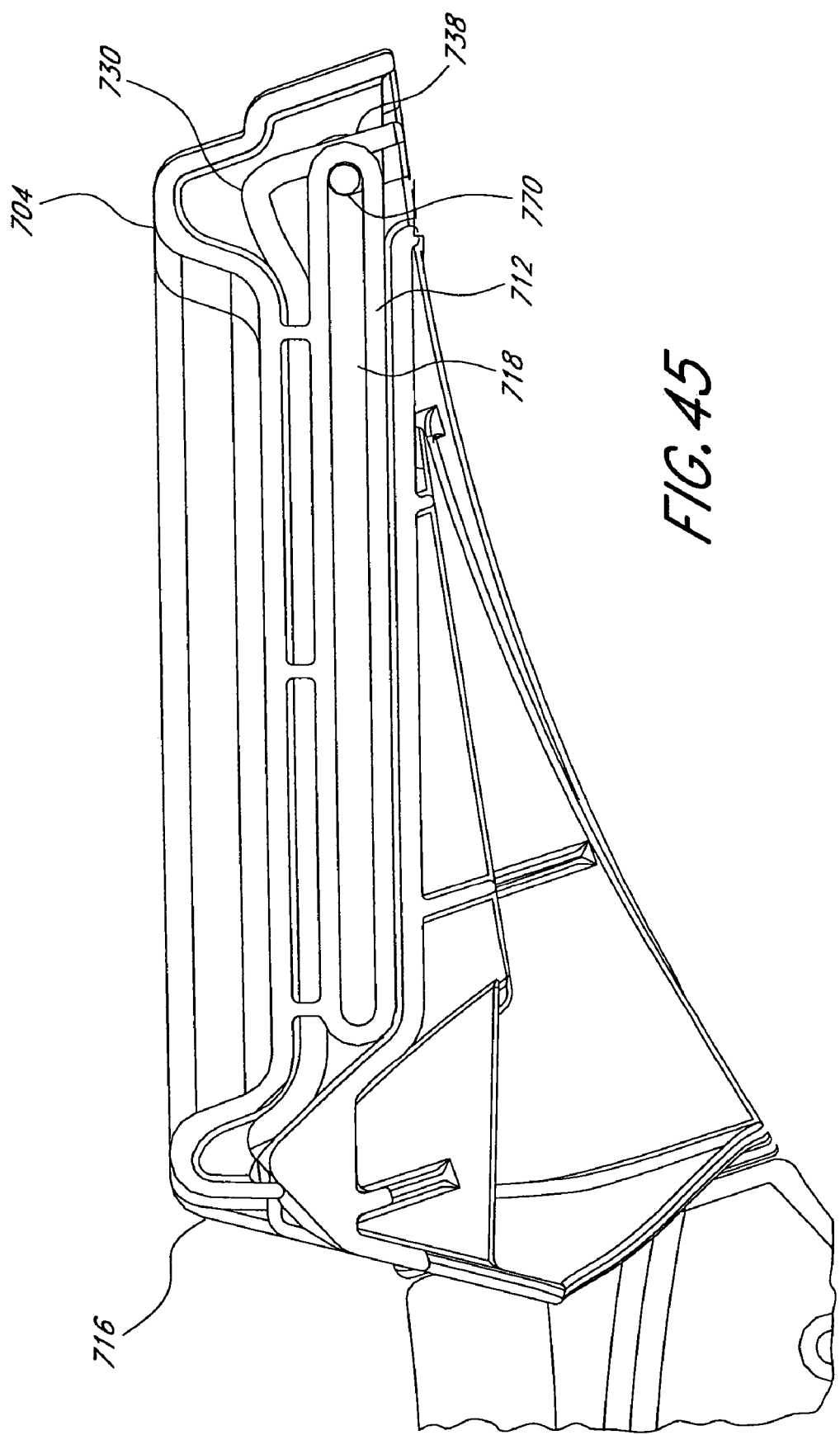
FIG. 45 is a cross-sectional view of the tray and tray bar taken along one of the runners of the tray, with the tray cradled in the tray bar.

With reference now to FIG. 45, in the illustrated embodiment, the tray 704 is connected to the tray bar 730 by a pivot rod 770 that extends along the front 738 of the tray bar 730 through the slots 718 in the runners 712. When the tray 704 is in its use position, as illustrated in FIG. 45, the tray 704 is cradled by the tray bar 730. The tray lock 720 extends into the lock opening 750 of the tray bar 730 to lock the tray 704 in place.

Figure 46:
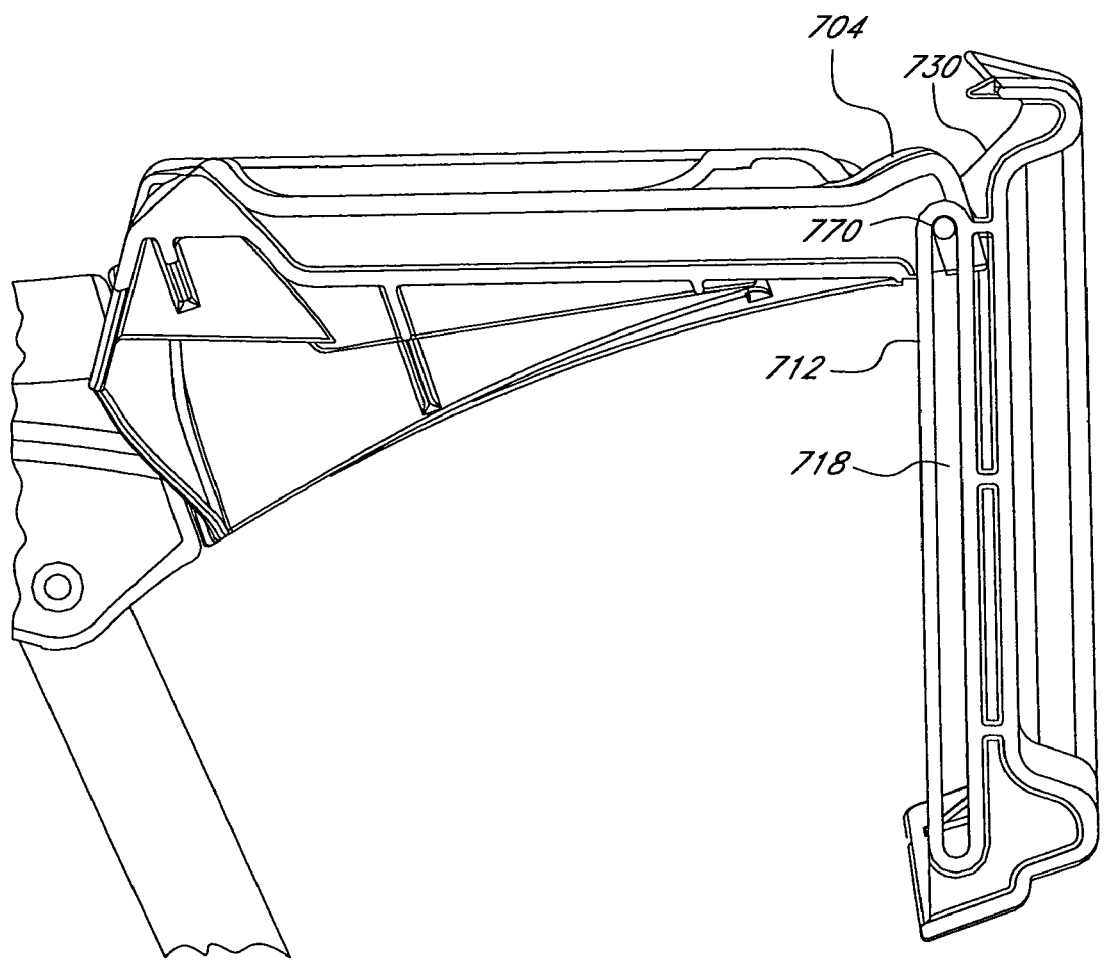
FIG. 46 is a cross-sectional view of the tray and tray bar taken along one of the runners of the tray, with the tray rotated away from the tray bar.
Figure 47:
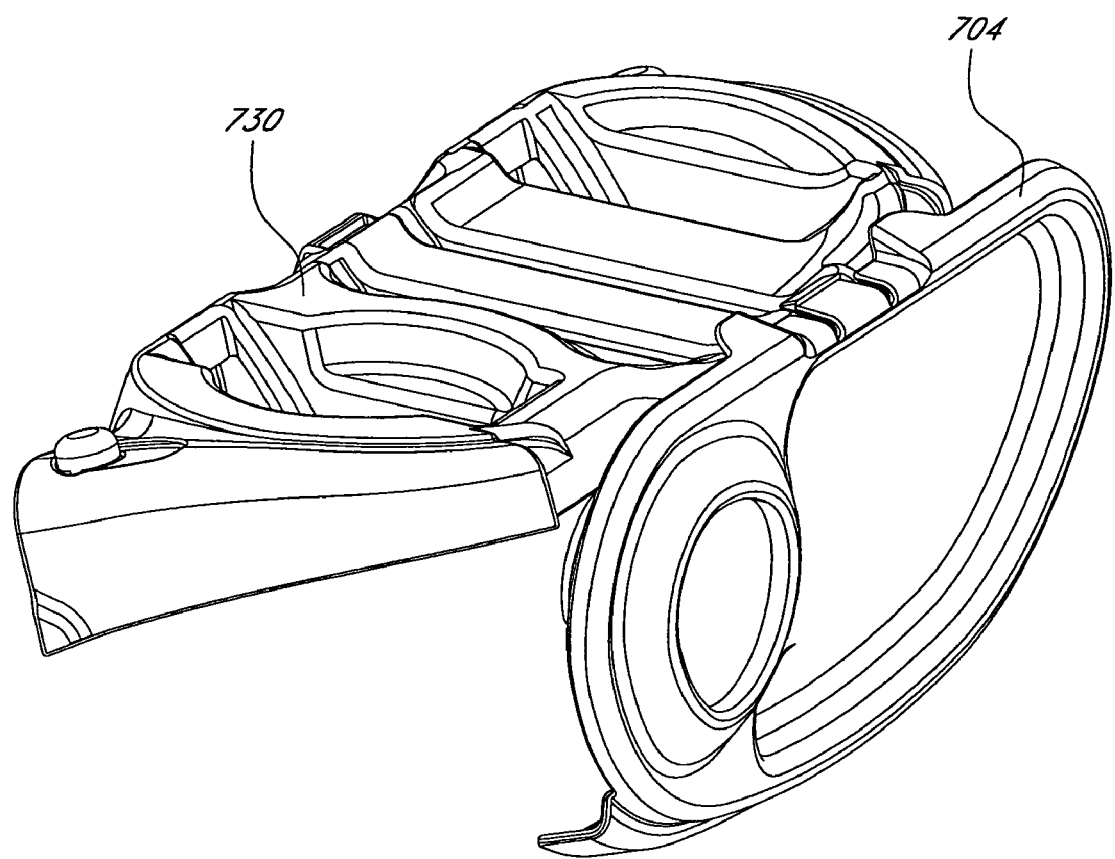
FIG. 47 is a perspective view of the tray bar and tray, with the tray rotated away from the tray bar.

Prior to connecting the infant car seat 20 to the stroller 700, the lock 720 is released and the rear 716 of the tray 704 is pivoted upwardly about the pivot rod 770 away from the tray bar 730. The tray 704 is then lowered by allowing the pivot rod 770 to slide through the slots 718 in the runners 712 until it reaches the rear ends of the slots 718, as illustrated in FIGS. 46 and 47. Accordingly, the tray 704 remains connected to the tray bar 730 even when it is not in use, thereby reducing the likelihood of misplacing the tray 704.

With reference again to FIG. 43, in the illustrated embodiment, each of the openings 748 in the tray bar 730 has a stepped outer side wall 780. An attachment bar 784 is defined behind each of the openings 748. Each of the attachment bars 784 preferably has an inverted "V" shaped cross section that corresponds to the shape of the upper ends of the slots 490 in the supports 242 of the car seat 20 (see FIG. 28).

Figure 48:
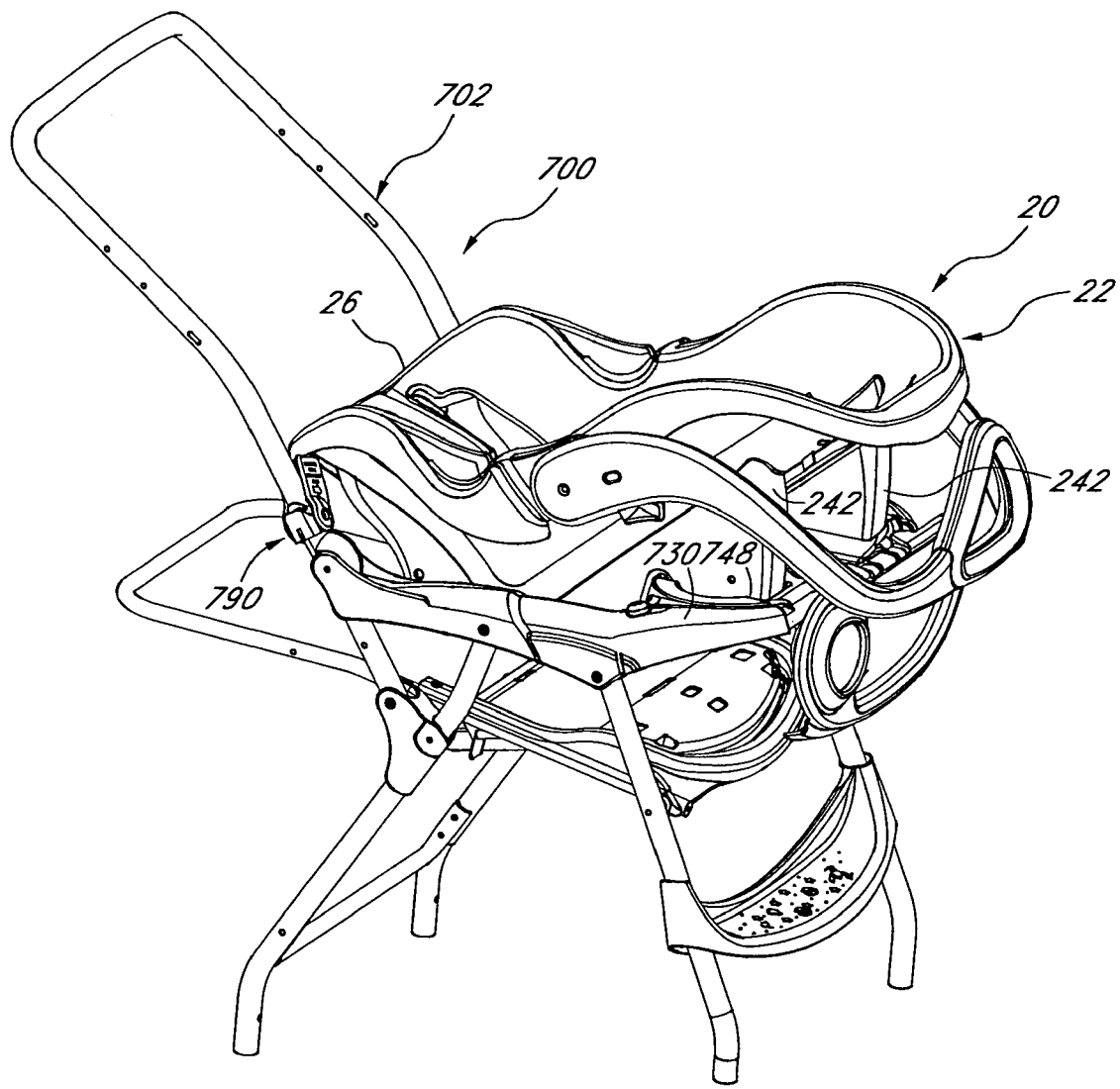
FIG. 48 is a perspective view of the car seat and the stroller, with the car seat connected to the stroller.
Figure 49:
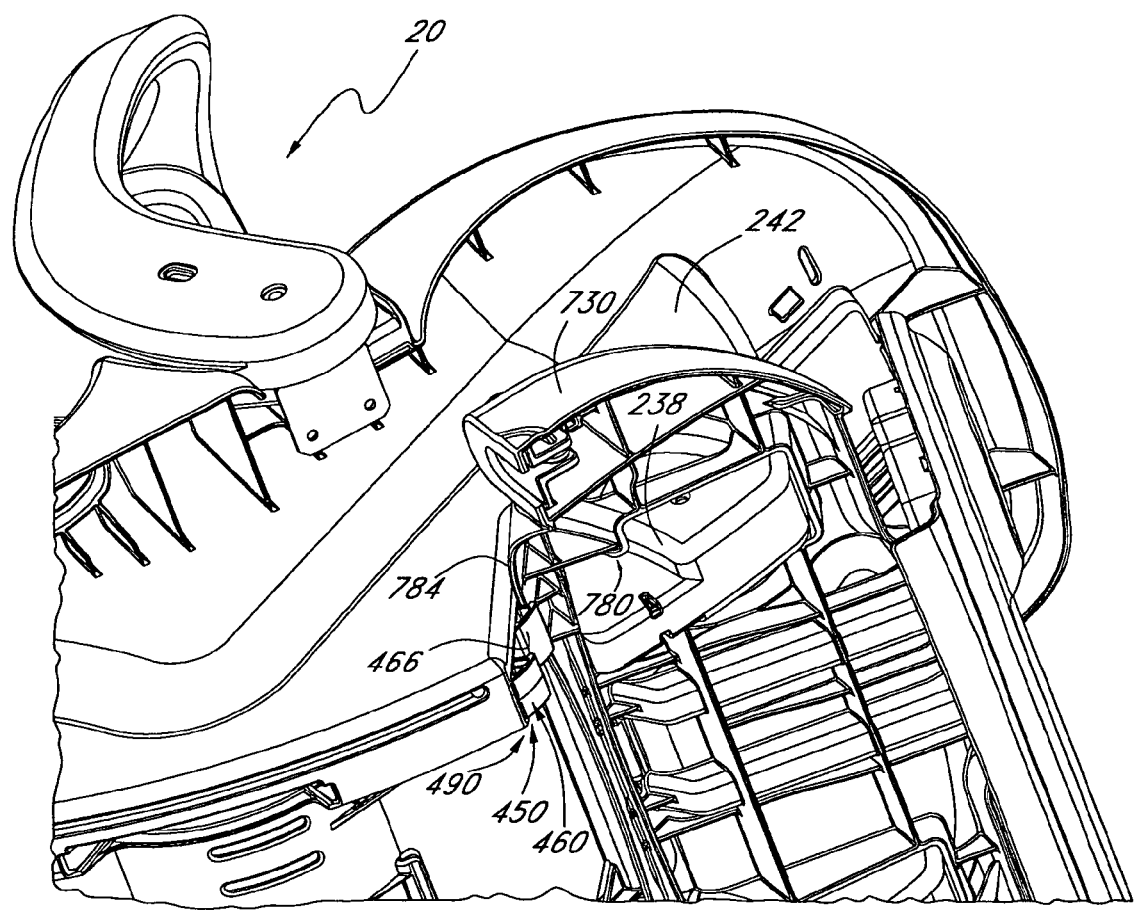
FIG. 49 is a perspective view of the bottom of the car seat and tray bar, with the car seat connected to the tray bar.

With reference now to FIG. 48, to connect the infant car seat 20 to the stroller 700, the car seat 20 is lowered onto the stroller 700 so that the supports 242 extend into the openings 748 in the tray bar 730. The attachment bars 784 are guided upwardly through the slots 490 in the supports 242. As the car seat 20 is lowered, the attachment bars 784 deflect the first legs 460 of the attachment hooks 450. When the attachment bars 784 reach the upper ends of the slots 490, the first legs 460 of the attachment hooks 450 spring back so that the upper barbs 466 abut the bottom of the tray bar 730, as illustrated in FIG. 49. The stepped outer side walls 780 of the openings 748 cooperate with the stepped outer side walls 238 of the supports 242 to prevent rotation of the car seat 20 relative to the tray bar 730.

Figure 50:
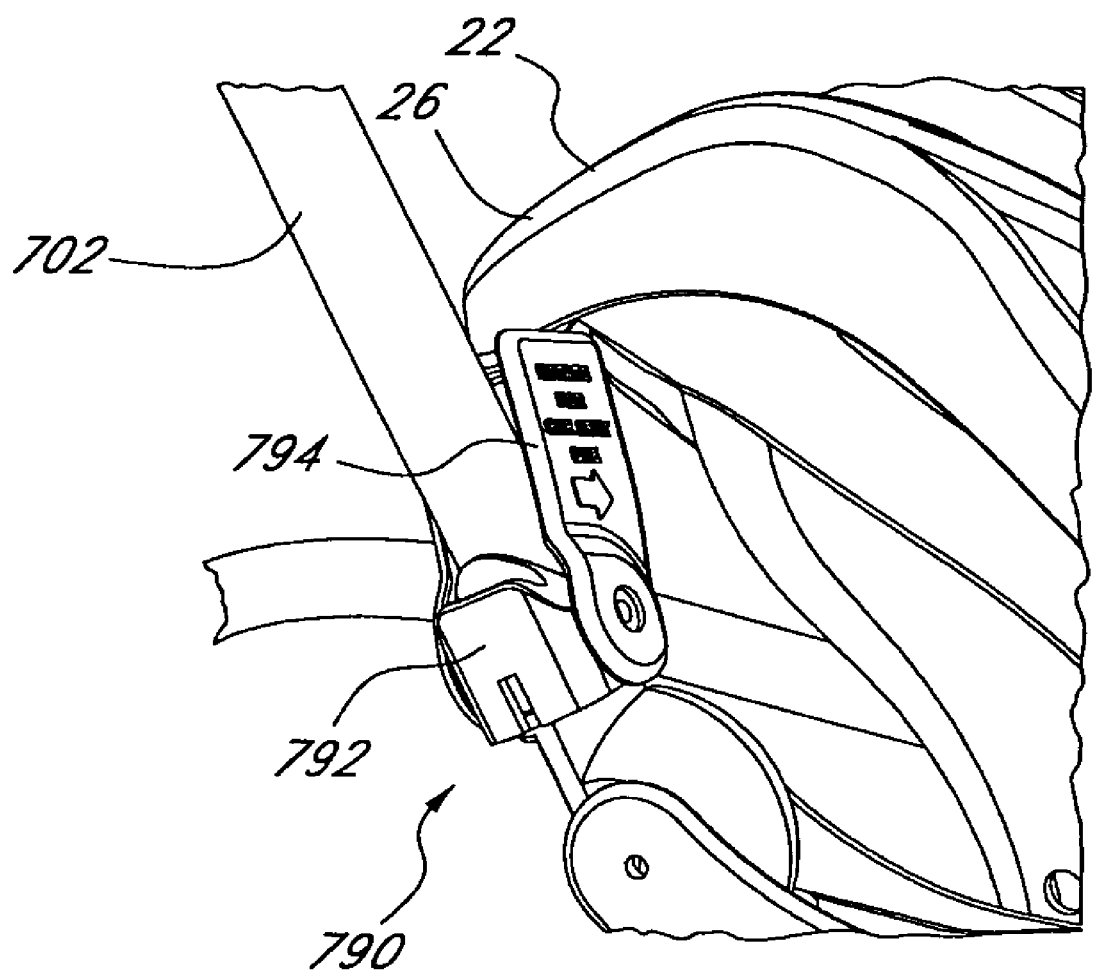
FIG. 50 is a perspective view of one of the supports connected to the stroller, with the support deployed to support the car seat.

The stroller frame 702 preferably is provided with integral supports for supporting the foot end 26 of the seat shell 22. Alternatively, however, as illustrated in FIGS. 48 and 50, add-on supports 790 can be provided. In the illustrated embodiment, the add-on supports 790 are retractable. As illustrated in FIG. 50, each of the supports 790 preferably includes a ring portion 792 that clasps the stroller frame 702 and a finger portion 794 pivotably connected to the ring portion 792. To deploy the supports 790, the finger portions 794 are pivoted inwardly away from the frame 702. The foot end 26 of the seat shell 22 can then be lowered onto the finger portions 794.

To release the car seat 20 from the stroller 700, the release handle 420 is moved towards the foot end 26 of seat shell 20. As the handle 412 is moved towards the foot end 26, the release straps 430 (see FIG. 30) pull the first legs 460 of the mounting hooks 450 away from the second legs 462 so that the upper barbs 466 do not abut the bottom of the tray bar 730. The car seat 20 can then be lifted off of the stroller 70.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. An apparatus, comprising:
   a base, comprising:
      a main body; and
      a connection bracket extending from said main body, said connection bracket comprising a first side wall having a first slot therein, a first pawl pivotably connected adjacent said first side wall, a biasing member biasing said first pawl towards said first slot, a second side wall spaced apart from said first side wall and having a second slot therein, a second pawl pivotably connected adjacent said second side wall, and a second biasing member biasing said second pawl towards said second slot; and
   an infant car seat, comprising:
      a seat shell; and
      a rod extending through said seat shell, said rod extending into said first and second slots when said car seat is situated on said base, said first and second pawls extending over said rod to lock said car seat to said base.

2. The apparatus of claim 1, wherein a curved slot is provided in each of said first and second side walls for passage of a vehicle seat belt.

3. The apparatus of claim 1, said car seat further comprising a release handle movably connected to said seat shell, said release handle contacting said first and second pawls as said handle is moved to pivot said pawls away from said rod and allow said rod to be removed from said first and second slots.

4. An apparatus comprising:
   a base comprising a main body and a connection bracket extending from said main body, said connection bracket comprising a first side wall having a first slot therein, a first pawl pivotably connected adjacent said first side wall, a biasing member biasing said first pawl towards said first slot, a second side wall spaced apart from said first side wall and having a second slot therein, a second pawl pivotably connected adjacent said second side wall, and a second biasing member biasing said second pawl towards said second slot; and
   an infant car seat comprising a seat shell; a rod extending through said seat shell, said rod extending into said first and second slots when said car seat is situated on said base, said first and second pawls extending over said rod to lock said car seat to said base; a release handle movably connected to said seat shell, said release handle contacting said first and second pawls as said handle is moved to pivot said pawls away from said rod and allow said rod to be removed from said first and second slots; a first mounting hook including a first leg and a second leg connected to said first leg, said first leg having a barb extending therefrom, said barb extending into a first recess in said seat shell; a second mounting hook including a first leg and a second leg connected to said first leg, said first leg having a barb extending therefrom, said barb extending into a second recess in said seat shell; a first strap connecting said release handle to said first leg of said first mounting hook; and a second strap connecting said release handle to said first leg of said second mounting hook.

5. The apparatus of claim 4, said base further comprising a first mount and a second mount, said barbs engaging said first and second mounts when said car seat is situated on said base.

6. The apparatus of claim 5, wherein movement of said release handle causes said first and second straps to pull said first legs of said mounting hooks away from said second legs, releasing said barbs from said mounts.

7. The apparatus of claim 4, wherein said first and second mounting hooks comprise acetyl.

8. The apparatus of claim 4, wherein said first and second mounting hooks have an inverted "V" shape.

9. The apparatus of claim 4, wherein said release handle is slideably connected to the seat shell near the foot end.

10. An apparatus comprising:
    a base, comprising:
       a main body; and
       a connection bracket extending from said main body, said connection bracket comprising a first side wall having a first slot therein, a first pawl pivotably connected adjacent said first side wall, a biasing member biasing said first pawl towards said first slot, a second side wall spaced apart from said first side wall and having a second slot therein, a second pawl pivotably connected adjacent said second side wall, and a second biasing member biasing said second pawl towards said second slot; and
    an infant car seat, comprising:
       a seat shell;
       a rod extending through said seat shell, said rod extending into said first and second slots when said car seat is situated on said base, said first and second pawls extending over said rod to lock said car seat to said base; and
       a release handle movably connected to said seat shell, said release handle contacting said first and second pawls as said handle is moved to pivot said pawls away from said rod and allow said rod to be removed from said first and second slots, wherein said release handle is connected to said seat shell by a pair of hooks that extend into slots in the seat shell.

11. An apparatus comprising:
    a base, comprising:
       a main body; and
       a connection bracket extending from said main body, said connection bracket comprising a first side wall having a first slot therein, a first pawl pivotably connected adjacent said first side wall, a biasing member biasing said first pawl towards said first slot, a second side wall spaced apart from said first side wall and having a second slot therein, a second pawl pivotably connected adjacent said second side wall, and a second biasing member biasing said second pawl towards said second slot; and
    an infant car seat, comprising:
       a seat shell;
       a rod extending through said seat shell, said rod extending into said first and second slots when said car seat is situated on said base, said first and second pawls extending over said rod to lock said car seat to said base;
       a release handle movably connected to said seat shell, said release handle contacting said first and second pawls as said handle is moved to pivot said pawls away from said rod and allow said rod to be removed from said first and second slots, wherein a biasing member biases the release handle towards the head end of the seat shell.

12. An apparatus comprising a base; and an infant car seat comprising a seat shell, wherein said seat shell is removably connected to said base through four or more connectors, and a release handle, wherein moving said release handle operates to release each of the four or more connectors, thereby allowing the seat shell to be removed from the base, wherein:

a first connector of said four or more connectors comprises a first mounting hook including a first leg and a second leg connected to said first leg, said first leg having a barb extending therefrom, wherein said barb is configured to engage a first mount on said base when the seat shell is connected to the base;

a second connector of said four or more connectors comprises a second mounting hook including a first leg and a second leg connected to said first leg, said first leg having a barb extending therefrom, wherein said barb is configured to engage a second mount on said base when the seat shell is connected to the base; and the release handle is operably connected to said first mounting hook and to said second mounting hook such that moving the release handle causes the first leg of said first mounting hook to rotate about the point at which the first and second legs of said first mounting hook connect and causes the first leg of said second mounting hook to rotate about the point at which the first and second legs of said second mounting hook connect.

13. The apparatus of claim 12, wherein a third connector and a fourth connector of said four or more connectors each comprise a first pawl pivotably connected to said base and a biasing member biasing said pawl towards a slot in said base.

* * * * *

UNITED STATES PATENT AND TRADEMARK OFFICE
CERTIFICATE OF CORRECTION

PATENT NO. : 6,979,057 B2  Page 1 of 1
APPLICATION NO. : 10/854727
DATED : December 27, 2005
INVENTOR(S) : Mark A. Sedlack It is certified that error appears in the above-identified patent and that said Letters Patent is hereby corrected as shown below:

On the title page, item 56
On page 2, column 2 (U.S. Patents Documents), delete "Yoshida et al." and insert --Nakagawa et al.--.
In column 1, line 7, before "which" insert --,--.
In column 8, line 58, replace "Multiple-range" with --Multiple-Range--.

Signed and Sealed this

Fourth Day of July, 2006

JON W. DUDAS
*Director of the United States Patent and Trademark Office*